(12) United States Patent
Park et al.

(10) Patent No.: US 7,764,718 B2
(45) Date of Patent: *Jul. 27, 2010

(54) SUPERFLUORESCENT FIBER SOURCE WITH ENHANCED MEAN WAVELENGTH STABILITY

(75) Inventors: Hee Gap Park, Daejeon (KR); Michel J. F. Digonnet, Palo Alto, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/836,040

(22) Filed: Aug. 8, 2007

(65) Prior Publication Data

US 2008/0144674 A1 Jun. 19, 2008

Related U.S. Application Data

(63) Continuation of application No. 10/676,543, filed on Oct. 1, 2003, now Pat. No. 7,269,190.

(60) Provisional application No. 60/415,693, filed on Oct. 2, 2002.

(51) Int. Cl.
*H01S 3/30* (2006.01)
(52) U.S. Cl. .................. 372/6; 372/29.02; 372/32
(58) Field of Classification Search .............. 372/6, 372/29.02, 32
See application file for complete search history.

(56) References Cited

U.S. PATENT DOCUMENTS

| | | | | |
|---|---|---|---|---|
| 4,938,556 A | * | 7/1990 | Digonnet et al. | ....... 359/341.31 |
| 5,177,562 A | * | 1/1993 | Wysocki et al. | ............. 356/460 |
| 5,530,584 A | * | 6/1996 | Myslinski et al. | ........ 359/337.1 |
| 5,701,318 A | | 12/1997 | Digonnet et al. | |
| 5,875,203 A | * | 2/1999 | Wagener et al. | ................. 372/6 |

(Continued)

FOREIGN PATENT DOCUMENTS

EP 0 476 914 A2 3/1992

(Continued)

OTHER PUBLICATIONS

Falquier, D.G., "Erbium doped superfluorescent fiber sources for the fiber optic gyroscope," Ph.D. dissertation, Dec. 2000, Applied Physics Department, Stanford University, Stanford, California.

(Continued)

*Primary Examiner*—Minsun Harvey
*Assistant Examiner*—Kinam Park
(74) *Attorney, Agent, or Firm*—Knobbe, Martens, Olson & Bear, LLP

(57) ABSTRACT

A doped superfluorescent fiber source (SFS) has an enhanced mean wavelength stability. A method stabilizes the mean wavelength of a SFS. The method includes providing an SFS including a doped fiber. The method further includes pumping the SFS with pump light from a pump source having a wavelength dependent on the temperature of the pump source and dependent on the power of the pump light. The method further includes optimizing the length of the fiber to reduce the influence of the pump light wavelength on the stability of the mean wavelength.

14 Claims, 13 Drawing Sheets

U.S. PATENT DOCUMENTS

| | | | | |
|---|---|---|---|---|
| 6,483,628 | B1 * | 11/2002 | Digonnet et al. | 359/333 |
| 6,807,204 | B1 * | 10/2004 | O'Dowd | 372/32 |
| 7,269,190 | B2 * | 9/2007 | Park et al. | 372/29.02 |

FOREIGN PATENT DOCUMENTS

| | | |
|---|---|---|
| JP | 2001-160641 | 6/2001 |
| JP | HEI07-074418 | 3/2005 |

OTHER PUBLICATIONS

Hall, D. C., et al., "High-stability $Er^{3+}$-doped superfluorescent fiber sources," *J. Lightwave Tech.*, vol. 13, No. 7, pp. 1452-1460, Jul. 1995.

Wysocki, P.F., et al., "Characteristics of erbium-doped superfluorescent fiber sources for interferometric sensor applications," *J. Lightwave Tech.*, vol. 12, No. 3, pp. 550-567, Mar. 1994.

Gaiffe, T., et al., "Wavelength stabilization of an erbium-doped-fiber source with a fiber Bragg grating for high-accuracy FOG," *Proc. SPIE*, vol. 2837, pp. 375-380, 1996.

Patrick, H.J., et al., "Erbium-doped superfluorescent fibre source with long period fibre grating wavelength stabilisation," *Electron. Lett.*, vol. 33, No. 24, pp. 2061-2063, 1997.

Digonnet, M.J.F., "Broadband fiber sources," *Rare-Earth-Doped Fiber Lasers and Amplifiers*, pp. 313-340, 2001, 2nd Edition, M.J.F. Digonnet, Ed., Marcel Dekker, Inc., New York.

Wysocki, P., et al., "Wavelength Stability of a High-Output, Broadband, Er-Doped Superfluorescent Fiber Source Pumped near 980 nm," *Opt. Lett.*, vol. 16, No. 12, pp. 961-963, Jun. 1991.

Zatta, P.Z., et al., "Ultra-high-stability two-stage superfluorescent fibre sources for fibre optic gyroscopes," *Electron. Lett.*, vol. 38, No. 9, pp. 406-408, Apr. 2002.

Falquier, D.G., et al., A depolarized Er-doped superfluorescent fiber source with improved long-term polarization stability, *IEEE Photon. Tech. Lett.*, vol. 13, pp. 25-27, Jan. 2001.

Falquier, D.G., et al., "A polarization-stable Er-doped superfluorescent fiber source including a Faraday rotator mirror," *IEEE Photon. Tech. Lett.*, vol. 12, pp. 1465-1467, Nov. 2000.

Kemtchou, J., et al., "Absorption and emission cross-sections measurements for temperature dependent modeling of erbium-doped fibers amplifiers," *Proceedings of Third Optical Fibre Measurement Conference*, Liege, Belgium, pp. 1-4, 1995.

Morkel, P.R., "Erbium-doped fibre superfluorescent for the fibre gyroscope," *Optical Fiber Sensors, Springer Proc. in Physics*, vol. 44, pp. 143-148, 1989.

Wysocki, P.F., et al., "Broadband Fiber Sources for Gyros," *SPIE Proceedings on Fiber Optic Gyros: 15th Anniversary*, vol. 1585 (SPIE, Boston, Massachusetts, 1991), pp. 371-382.

Digonnet, Michel, *Broadband Fiber Sources*, Rare-Earth-Doped Fiber Lasers and Amplifiers, US, Marcel Dekker, Inc., 2001, Second Edition, pp. 313-340.

Hall et al., *High-Stability $Er^{3+}$ -Doped Superfluorescent Fiber Sources*, Journal of Lightwave Technology, IEEE, Jul. 1995, vol. 13, No. 7, pp. 1452-1460.

* cited by examiner

SUPERFLUORESCENT FIBER SOURCE WITH ENHANCED MEAN WAVELENGTH STABILITY

RELATED APPLICATION

The present application is a continuation of U.S. patent application Ser. No. 10/676,543, filed Oct. 1, 2003, now U.S. Pat. No. 7,269,190 which is incorporated in its entirety by reference herein, and which claims the benefit of priority under 35 U.S.C. §119(e) of U.S. Provisional Application No. 60/415,693, filed on Oct. 2, 2002, which is incorporated in its entirety by reference herein.

BACKGROUND OF THE INVENTION

1. Field of the Invention

The present invention relates generally to methods and devices for providing laser light for optical systems and more particularly relates to superfluorescent fiber sources for providing laser light with enhanced mean wavelength stability.

2. Description of the Related Art

Er-doped superfluorescent fiber sources (SFSs) have been studied extensively for their application in fiber optic gyroscopes (FOGs). SFSs exhibit a unique combination of high efficiency, high spatial coherence, broad spectral emission, and excellent long-term stability of the mean wavelength. See, e.g., D. G. Falquier, "Erbium doped superfluorescent fiber sources for the fiber optic gyroscope," Ph. D. dissertation, December 2000, Applied Physics Department, Stanford University, Stanford, Calif.; D. C. Hall et al., "High-stability $Er^{3+}$-doped superfluorescent fiber sources," *J. Lightwave Tech.*, Vol. 13, No. 7, pp. 1452-1460, July 1995; and P. F. Wysocki et al., "Characteristics of erbium-doped superfluorescent fiber sources for interferometric sensor applications," *J. Lightwave Tech.*, Vol. 12, No. 3, pp. 550-567, March 1994, each of which is incorporated in its entirety by reference herein.

Long term stability of the mean wavelength of the SFS is desirable because the scale factor of a FOG scales with the mean wavelength of the source. Therefore, accurate knowledge of the scale factor, and thus of the mean wavelength, is particularly useful for accurate measurements of the absolute rotation rate from the FOG. D. C. Hall et al. (cited above) have reported a mean wavelength stability for an Er-doped SFS of the order of 8 parts per million (ppm). This mean wavelength stability is adequate for low- to medium-accuracy FOGs. However, high-accuracy inertial navigation FOGs utilize a higher stability of the mean wavelength over many hours.

The prior art does not report an SFS with a sufficient mean wavelength stability for high accuracy applications. One reason for this is that it is difficult to stabilize the various parameters upon which the mean wavelength of an SFS depends (e.g., the wavelength, power, and polarization of the pump, the temperature and birefringence of the fiber, and the optical feedback returning from the FOG). Previous efforts have provided detailed studies of the contributions of these individual parameters to the mean wavelength and have reported various methods of effectively reducing these contributions and/or the variability of these contributions. Besides the exemplary reports of such previous efforts of D. C. Hall et al. and of P. F. Wysocki et al., both cited above, other exemplary reports include T. Gaiffe et al., "Wavelength stabilization of an erbium-doped-fiber source with a fiber Bragg grating for high-accuracy FOG," *Proc. SPIE*, Vol. 2837, pp. 375-380, 1996; H. J. Patrick et al., "Erbium-doped superfluorescent fibre source with long period fibre grating wavelength stabilisation," *Electron. Lett.*, Vol. 33, No. 24, pp. 2061-2063, 1997; M. J. F. Digonnet, "Broadband fiber sources," in *Rare-Earth-Doped Fiber Lasers and Amplifiers*, pp. 313-340, 2001, $2^{nd}$ Edition, M. J. F. Digonnet, Ed., Marcel Dekker, Inc., New York; P. Wysocki et al., "Wavelength Stability of a High-Output, Broadband, Er-Doped Superfluorescent Fiber Source Pumped near 980 nm," *Opt. Lett.*, Vol. 16, No. 12, pp. 961-963, June 1991; and P. Z. Zatta et al., "Ultra-high-stability two-stage superfluorescent fibre sources for fibre optic gyroscopes," *Electron. Lett.*, Vol. 38, No. 9, pp. 406-408, April 2002, each of which is incorporated in its entirety by reference herein.

The dependence of the mean wavelength on the pump wavelength has been previously reduced by selecting the pump wavelength appropriately and by stabilizing the laser diode temperature and current. The pump power dependence of the mean wavelength has been previously reduced by proper selection of the pump power and fiber length. Stabilizing the laser diode temperature and stabilizing the current have also been used to reduce the pump power dependence of the mean wavelength. The effects of optical feedback on the mean wavelength can be reduced, and even cancelled, by proper design of the SFS configuration and by optically isolating the SFS and the gyro coil. These contributions to the mean wavelength have thus been reduced to a few ppm level or less, but further stabilization is still desirable.

SUMMARY OF THE INVENTION

In certain embodiments, a method stabilizes the mean wavelength of light generated by a superfluorescent fiber source (SFS). The method comprises providing the SFS. The SFS comprises an Er-doped fiber (EDF) having a first end, a second end, and a length between the first end and the second end. The SFS further comprises a coupler optically coupled to the first end of the EDF. The SFS further comprises a pump source optically coupled to the coupler. The pump source produces pump light. The mean wavelength is influenced by a wavelength of the pump light. The wavelength of the pump light depends on the temperature of the pump source and depends on the power of the pump light. The pump light propagates to the EDF via the coupler. The EDF responds to the pump light by producing forward amplified spontaneous emission (ASE) light propagating away from the pump source and backward ASE light propagating towards the pump source. The SFS further comprises a mirror optically coupled to the coupler. The mirror reflects the backward ASE light as reflected ASE light which propagates to the EDF. The reflected ASE light is amplified as it travels through the EDF. The forward ASE light and the amplified reflected ASE light propagate out of the second end of the EDF. The SFS further comprises an optical isolator coupled to the second end of the EDF. The forward ASE light and the amplified reflected ASE light from the second end of the EDF are transmitted through the optical isolator as the SFS output light. The method further comprises optimizing the length of the EDF. The method further comprises reducing the influence of the pump light wavelength on the stability of the mean wavelength.

In certain other embodiments, a superfluorescent fiber source (SFS) generates output light having a mean wavelength with a selected stability. The SFS comprises an Er-doped fiber (EDF) having a first end, a second end, and a length between the first end and the second end. The SFS further comprises a coupler optically coupled to the first end of the EDF. The SFS further comprises a pump source optically coupled to the coupler. The pump source produces pump light. The mean wavelength of the output light is influenced by a wavelength of the pump light. The wavelength of the pump light depends on the temperature of the pump source and depends on the power of the pump light. The pump light propagates to the EDF via the coupler. The EDF responds to the pump light by producing forward amplified spontaneous emission (ASE) light propagating away from the pump source and backward ASE light propagating towards the pump source. The SFS further comprises a mirror optically coupled to the coupler. The mirror reflects the backward ASE light as reflected ASE light which propagates to the EDF. The reflected ASE light is amplified as it travels through the EDF. The forward ASE light and the amplified reflected ASE light propagate out of the second end of the EDF. The SFS further comprises an optical isolator coupled to the second end of the EDF. The forward ASE light and the amplified reflected ASE light from the second end of the EDF are transmitted through the optical isolator as the output light. The stability of the mean wavelength of the output light is selected by optimizing the length of the EDF and reducing the influence of the pump light wavelength on the mean wavelength.

In certain embodiments, a method determines an estimated mean wavelength of a superfluorescent fiber source (SFS). The method comprises providing an SFS having an actual mean wavelength. The SFS comprises an erbium-doped fiber (EDF) having a temperature and a pump source. The method further comprises configuring the SFS such that the actual mean wavelength has a dependence on the temperature of the EDF. The method further comprises obtaining the dependence of the actual mean wavelength on the temperature of the EDF. The method further comprises measuring the temperature of the EDF. The method further comprises calculating the estimated mean wavelength using the measured temperature of the EDF and the dependence of the actual mean wavelength on the temperature of the EDF.

In certain embodiments, a superfluorescent fiber source (SFS) is provided. The SFS has a mean wavelength which is stable to within approximately ±0.5 part per million over a period of time of at least one hour.

In certain embodiments, a superfluorescent fiber source (SFS) generates output light having a mean wavelength with a selected stability. The SFS comprises an erbium-doped fiber (EDF) having a length disposed between a first end and a second end, and the EDF has a temperature. The SFS further comprises a pump source controlled to produce pump light at a substantially constant pump wavelength. The mean wavelength of the SFS is influenced by the pump wavelength. The pump wavelength depends on the temperature of the pump source and depends on the power of the pump light. The pump light is coupled to the first end of the EDF to propagate toward the second end of the EDF. The EDF is responsive to the pump light to produce forward amplified spontaneous emission (ASE) light that propagates toward the second end of the EDF and is output from the second end of the EDF. The EDF is further responsive to the pump light to produce backward ASE light that propagates toward the first end of the EDF. The backward ASE light has a first polarization. The SFS further comprises a mirror optically coupled to receive the backward ASE light. The mirror reflects the backward ASE light to produce reflected ASE light at a second polarization orthogonal to the first polarization. The reflected ASE light is coupled to the first end of the EDF and is amplified upon propagating through the length of the EDF to the second end of the EDF where the amplified reflected ASE light is output with the forward ASE light. The stability of the mean wavelength is selected by optimizing the length of the EDF and reducing the influence of the pump wavelength on the mean wavelength.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENT

Figure 1:
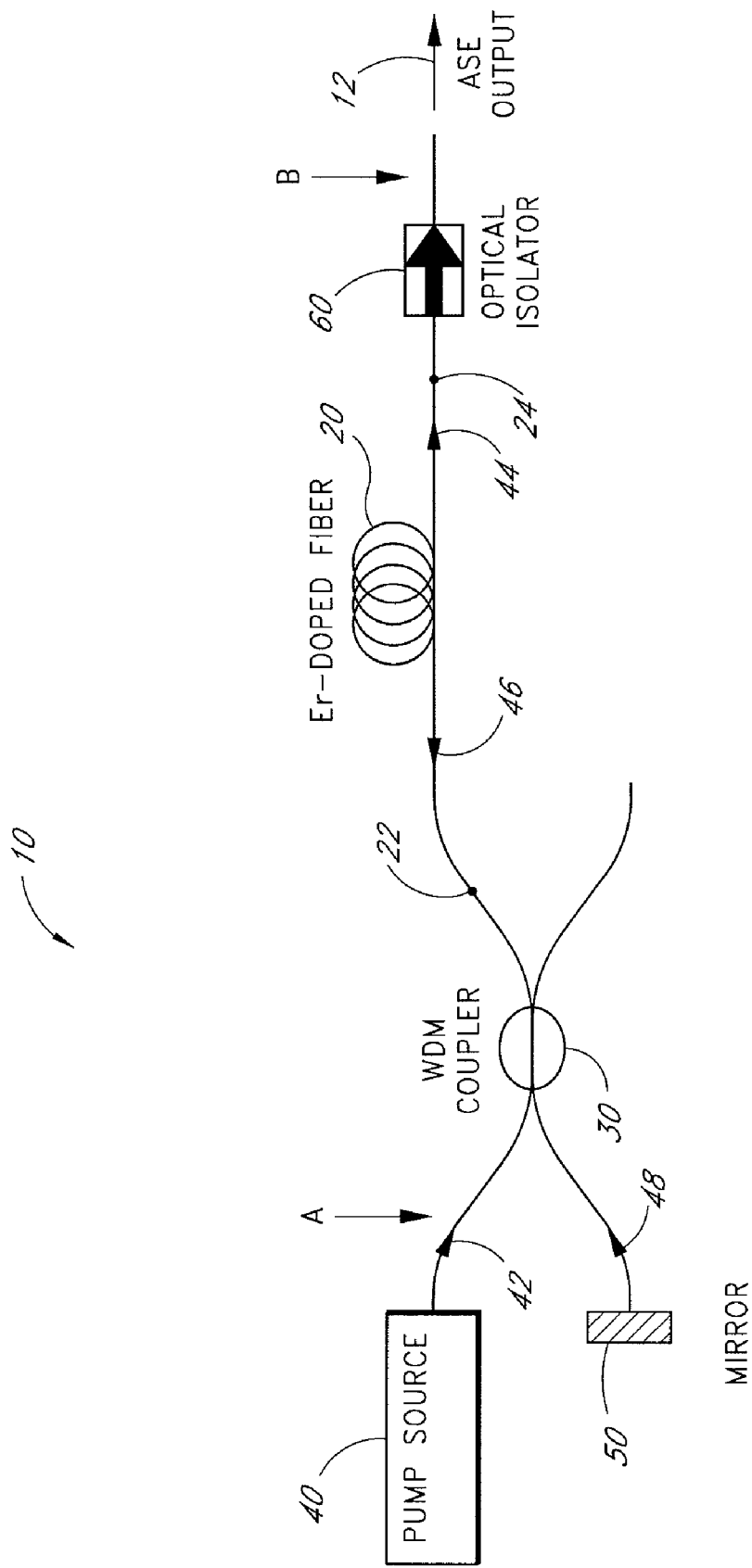
FIG. 1 schematically illustrates a superfluorescent fiber source (SFS) adapted to generate output light having a mean wavelength $<\lambda>$ in accordance with embodiments described herein.

FIG. 1 schematically illustrates a superfluorescent fiber source (SFS) 10 to generate SFS output light 12 having a mean wavelength $<\lambda>$ with a selected stability in accordance with embodiments described herein. The SFS 10 comprises an Er-doped fiber (EDF) 20 having a first end 22, a second end 24, and a length between the first end 22 and the second end 24. In certain embodiments, the EDF 20 also has a temperature, a temperature-dependent birefringence, and a polarization-dependent gain. The SFS 10 further comprises a coupler 30 optically coupled to the first end 22 of the EDF 20. In certain embodiments, the coupler 30 has a temperature-dependent birefringence and a polarization-dependent loss. The SFS 10 further comprises a pump source 40 optically coupled to the coupler 30. The pump source 40 produces pump light 42. The mean wavelength $<\lambda>$ of the SFS 10 is influenced by the wavelength of the pump light 42. The wavelength of the pump light 42 is dependent on the temperature of the pump source 40 and dependent on the power of the pump light 42. The pump light 42 propagates to the EDF 20 via the coupler 30. The EDF 20 responds to the pump light 42 by producing forward amplified spontaneous emission (ASE) light 44 propagating away from the pump source 40 and backward ASE light 46 propagating towards the pump source 40. The SFS 10 further comprises a mirror 50 optically coupled to the coupler 30. The mirror 50 reflects the backward ASE light 46 as reflected ASE light 48, which propagates to the EDF 20. The reflected ASE light 48 is further amplified as it travels through the EDF 20. The forward ASE light 46 and the amplified reflected ASE light propagate out of the second end 24 of the EDF 20. The SFS 10 further comprises an optical isolator 60 coupled to the second end 24 of the EDF 20. The forward ASE light 46 and the amplified reflected ASE light from the second end 24 of the EDF 20 are transmitted through the optical isolator 60 as the SFS output light 12. The stability of the mean wavelength $<\lambda>$ of the SFS output light 12 is selected by optimizing the length of the EDF 20 and reducing the influence of the pump light 42 wavelength on the mean wavelength.

In certain embodiments, the SFS 10 emits light having a wavelength of approximately 1550 nanometers and a linewidth of approximately 17 nanometers at a power of approximately 5 milliwatts. The linewidth is defined as described by D. C. Hall et al. in the reference cited above. Other values of the SFS bandwidth, in the range of approximately 1 nanometer to approximately 50 nanometers, can be achieved with this configuration and other source configurations by proper selection of the source parameters, in particular the pump power and the EDF length. In certain embodiments, the SFS 10 has a double-pass configuration, as illustrated in FIG. 1, which has a greater output power than a single-pass SFS configuration. Such double-pass configurations can also use shorter lengths of the EDF 20 than single-pass configurations and can enable a Faraday rotation mirror (FRM) to be used to eliminate polarization-related effects, as described more fully below. Such FRMs are preferable over long Lyot fiber depolarizers which can be used to eliminate polarization-related effects in single-pass configurations of the SFS 10.

In certain embodiments, the EDF 20 has a length of at least approximately 94 meters, but other lengths are compatible with embodiments described herein. This length is dictated in part by the source parameters, and in part by the concentration of the trivalent erbium ions in the EDF core. In these particular embodiments, the trivalent erbium ion concentration in the EDF core is such that the fiber has a small-signal absorption of approximately 3.7 decibels/meter at a wavelength of approximately 1.53 microns. The total small-signal absorption of the 94-meter fiber at approximately 1.53 microns is therefore approximately 348 decibels. In one advantageous embodiment, the EDF 20 has a core radius of approximately 1.1 microns and a numerical aperture of approximately 0.26. These core parameter values, combined with the total small-signal absorption value of 348 decibels, define a particular set of EDF parameters that optimize the SFS mean wavelength stability, as described more fully below. It should be understood, however, that this set is not unique, and that other sets of parameter values will provide substantially identical behavior. Such sets can be derived through numerical simulations of the SFS mean wavelength stability using one of several commercially available EDF simulators. As described more fully below, the length of the EDF 20 can be selected to reduce the power of the forward ASE light 44, thus reducing drifts of the mean wavelength due to residual polarization-dependent gain (PDG) effects from the forward ASE light 44.

In certain embodiments, the coupler 30 comprises a wavelength division multiplexer (WDM). Such a WDM coupler 30 transmits substantially all the light from the pump source 40 at a first wavelength (e.g., 1472 nanometers) to the EDF 20. Such a WDM coupler 30 also couples substantially all the backward ASE light 46 at a second wavelength (e.g., 1550 nanometers) from the EDF 20 to the mirror 50. Such a WDM coupler 30 also couples substantially all the reflected ASE light 48 at the second wavelength from the mirror 50 to the EDF 20. One skilled in the art will appreciate that an alternative WDM can be used that couples the pump light and that transmits the ASE light. When such an alternative is used, the positions of the pump source 40 and the mirror 50 are interchanged in the embodiment of FIG. 1.

In certain embodiments, the pump source 40 comprises a laser diode having a temperature and having a laser diode current (e.g., 10 microamps). The pump light 42 of certain embodiments is polarized and comprises laser light having an infrared wavelength, e.g., between approximately 1460 nanometers and approximately 1490 nanometers. Exemplary laser diodes include, but are not limited to, a 1472-nanometer laser diode with 30 milliwatts of fiber-pigtailed power. As described more fully below, in certain embodiments, the temperature of the pump source 40 is controllable to be stable within approximately 0.01 degree Celsius.

In certain embodiments, the mirror 50 comprises a Faraday rotation mirror (FRM). The mirror 50 of certain embodiments is fiber-pigtailed. FRMs are available commercially from several vendors, e.g., JDS Uniphase Corp. of San Jose, Calif., although many manufacturers offer such devices. In certain embodiments, the optical isolator 60 prevents time-dependent reflections at the output of the SFS 10 from introducing undesirable fluctuations in the SFS mean wavelength $<\lambda>$. The isolator isolation ratio is approximately 40 decibels or greater. Higher or lower values may be tolerable depending on details of the source design.

Pump Effects

Variations of the temperature of the pump source 40 (e.g., laser diode) can cause corresponding variations in the pump light 42 wavelength $\lambda_p$ generated by the pump source 40. These temperature-induced variations of the pump light 42 wavelength can cause corresponding variations in the SFS mean wavelength $<\lambda>$.

In certain embodiments, the influence of the pump light variations on the stability of the mean wavelength are preferably reduced. In certain such embodiments, the temperature of the pump source 40 is controlled to a sufficient stability so as to provide a predetermined stability of the SFS mean wavelength $>\lambda>$. In certain embodiments, the pump source 40 temperature can be controlled to ±0.01 degree Celsius. For a measured temperature dependence of a laser diode wavelength of approximately 1 nanometer/degree Celsius, the pump light 42 wavelength can thus have variations $\Delta\lambda_p$ of approximately ±0.01 nanometer. The magnitude of the corresponding variations of the SFS mean wavelength $<\lambda>$ depend on the dependence of the SFS mean wavelength $<\lambda>$ on the pump light 42 wavelength. As used herein, unless otherwise specified, all cited noise and fluctuation values are peak-to-peak values.

In certain embodiments, the influence of pump light variations on the stability of the SFS mean wavelength $<\lambda>$ can be reduced by tuning the pump light 42 wavelength $\lambda_p$ to an optimum wavelength (e.g., 1472 nanometers) at which the first-order dependence of the SFS mean wavelength $<\lambda>$ on the pump light 42 wavelength is small or substantially zero. In embodiments in which the pump light 42 wavelength differs slightly from the optimum wavelength, a residual dependence of the SFS mean wavelength $<\lambda>$ on temperature-induced variations of the pump light 42 wavelength can be expected. These temperature-induced variations have previously been evaluated by modeling the SFS 10 by assuming that the pump light 42 wavelength departs from the optimum wavelength by 1 nanometer (see, e.g., M. J. F. Digonnet, "Broadband fiber sources," in *Rare-Earth-Doped Fiber Lasers and Amplifiers*, pp. 99-101, 2001, $2^{nd}$ Edition, M. J. F. Digonnet, Ed., Marcel Dekker, Inc., New York, which is incorporated in its entirety by reference herein). The dependence of the SFS mean wavelength $<\lambda>$ on the pump light 42 wavelength $\lambda_p$ was then calculated to be $\delta<\lambda>/\delta\lambda_p \approx 0.015$. The variations of the SFS mean wavelength $<\lambda>$ due to temperature fluctuations of the pump source 40 were thus predicted to be only $\Delta<\lambda> \approx \pm 0.00015$ nanometer (±0.1 ppm). These variations in the SFS mean wavelength $<\lambda>$ due to thermally-induced fluctuations of the pump light 42 wavelength are thus negligible in embodiments in which the pump light 42 wavelength is tuned to or near an optimum wavelength.

In certain embodiments, the SFS mean wavelength $<\lambda>$ is dependent on the pump light 42 power, and the pump light 42 power is set to an optimum level at which the dependence is small or zero. For example, in certain embodiments, the pump source 40 comprises a laser diode with a current which is maintained at 10 microamps with a pump power stability of 1.3 microwatts. The calculated dependence of the SFS mean $<\lambda>$ on the pump light 42 power for this pump source 40 was modeled to be −0.085 nanometer/milliwatt. Correspondingly, variations of the pump light 42 power at the output of the pump source 40 can have a negligible effect on the SFS mean wavelength $<\lambda>$ (e.g., approximately 0.07 ppm).

While the power from the pump source 40 in certain embodiments is extremely stable, the pump light 42 power launched into the EDF 20 can vary over time. These variations can be due to the combined effects of (1) residual polarization-dependent loss (PDL) in the coupler 30 with (2) random variations in the pump light 42 polarization incident on the coupler 30 caused by thermal variations in the birefringence of the fiber pigtail between the pump source 40 and the EDF 20. For example, if the PDL of the coupler 30 is low (e.g., approximately 0.01 decibel), a launched power $P_p$ of 25 milliwatts will change by approximately 0.05 milliwatts as the pump polarization rotates by 90 degrees. For embodiments in which the dependence of the SFS mean wavelength $<\lambda>$ on the launched pump light 42 power $|\partial<\lambda>/\partial P_p|$ is 0.085 nanometer/milliwatt, this variation in the pump light 42 power launched into the EDF 20 corresponds to a variation of the SFS mean wavelength $<\lambda>$ of approximately 3 ppm. Such variations can be undesirably high. However, one should keep in mind that such large variations in the polarization of the pump incident on the EDF 20 are highly unlikely. The calculated 3-ppm variation is a limit unlikely to be reached. This effect can be reduced by selecting a WDM coupler 30 with minimal PDL. In certain embodiments, selecting such a WDM coupler 30 comprises obtaining and testing WDM couplers from various vendors to isolate those couplers with sufficiently low PDL. In certain other embodiments, the fiber pigtail between the pump source 40 and the EDF 20 is shortened to reduce this effect. To minimize the polarization excursion, the fiber pigtail temperature can also be maintained as constant as possible.

In other embodiments, the coefficient $|\partial<\lambda>/\partial P_p|$ is reduced by proper selection of the length of the EDF 20 and proper selection of the pump light 42 power. However, the EDF 20 length that minimizes $|\partial<\lambda>/\partial P_p|$ may or may not be sufficient to reduce the single-pass forward ASE light 44, as described below in relation to polarization-related effects. Modeling can be used to select a length of the EDF 20 that strikes a suitable compromise between reduction of the dependence of the SFS mean wavelength $<\lambda>$ on the pump light 42 power and reduction of the single-pass forward ASE light 44 contribution. In certain embodiments, the length of the EDF 20 is selected to greatly reduce the single-pass forward ASE light 44 contribution without concern of the effect of this longer length on $|\partial<\lambda>/\partial P_p|$. In certain such embodiments, $|\partial<\lambda>/\partial P_p|$ is low enough so that the overall stability of the SFS mean wavelength $<\lambda>$ is greatly improved.

Polarization-Related Effects

Polarization-related effects on the SFS mean wavelength $<\lambda>$ can arise from various contributions. In certain embodiments, the polarized nature of the pump light 42 can induce polarization-dependent gain (PDG) effects in the EDF 20. In embodiments in which the SFS 10 has a double-pass configuration and a standard reflector is used as the mirror 50 (rather than an FRM), PDG from the pump light 42 polarization results in the two eigenpolarizations of the output light 12 from the SFS 10 having substantially different mean wavelengths. The difference of mean wavelengths of the two polarizations can be in excess of 50 ppm. Certain embodiments utilize a polarizer at the input of the FOG to maintain reciprocity. Such effects are described more fully by D. G. Falquier et al., "A depolarized Er-doped superfluorescent fiber source with improved long-term polarization stability," *IEEE Photon. Tech. Lett.*, Vol. 13, pp. 25-27, January 2001; and D. G. Falquier et al., "A polarization-stable Er-doped superfluorescent fiber source including a Faraday rotator mirror," *IEEE Photon. Tech. Lett.*, Vol. 12, pp. 1465-1467, November 2000. Each of these references is incorporated in its entirety by reference herein. Further information is provided by M. J. F. Digonnet, "Broadband fiber sources," in *Rare-Earth-Doped Fiber Lasers and Amplifiers*, pp. 99-101, 2001, cited above.

Thermal variations in the birefringence of either the EDF 20 or the coupler 30 can cause fluctuations in the SFS mean wavelength $<\lambda>$ transmitted to the FOG. Similarly, stress variations of any portion of the SFS 10 can modify the birefringence, thereby causing variations of the pump light 42 polarization in the EDF 20 and of the SFS mean wavelength $<\lambda>$.

Polarization-related drift can be greatly reduced with either Lyot depolarizers or an FRM. For example, in certain embodiments, using an FRM as the mirror 50 ensures that the polarization of the reflected ASE light 48 is orthogonal to that of the backward ASE light 46 at all points along the EDF 20, thereby canceling the effects of PDG. Thus, the use of an FRM as the mirror 50 can reduce the polarization-dependent variability of the SFS mean wavelength $<\lambda>$ (e.g., to approximately 20 ppm). In other embodiments, an FRM is used as the mirror 50 in conjunction with other improvements, which further reduces the variability of the SFS mean wavelength $<\lambda>$. This configuration is further described by D. G. Falquier et al. in the November 2000 reference cited above, and in U.S. Pat. No. 6,483,628 B1 to Digonnet et al., which is incorporated in its entirety by reference herein.

In such embodiments utilizing the FRM as the mirror 50, the single-pass forward ASE light 44 is not reflected by the FRM, so the forward ASE light 44 does not experience polarization averaging, and its mean wavelength is still sensitive to polarization. This contribution to the variability of the SFS mean wavelength $<\lambda>$ is relatively small since the forward ASE light 44 passes through the EDF 20 only once, and thus has considerably less power than does the double-pass backward ASE light 46. However, this contribution to the variability of the SFS mean wavelength $\langle\lambda\rangle$ is partly responsible for the approximately 20-ppm residual mean wavelength variations described by the November 2000 study of D. G. Falquier et al. (cited above), in which perturbations were purposely applied to the birefringence of the EDF 20. The length of the EDF 20 can be selected to reduce the power in the forward ASE light 44, thus reducing variations of the SFS mean wavelength $\langle\lambda\rangle$ due to residual PDG effects from the forward ASE light 44.

In certain embodiments, a polarization controller (PC) is placed between the pump source 40 and the EDF 20 at point A on FIG. 1. The PC is adapted to vary the state of polarization (SOP) of the pump light 42 propagating into the EDF 20. Further information on such PCs is provided by U.S. Pat. No. 5,701,318 to Digonnet et al., which is incorporated in its entirety by reference herein. However, in certain such embodiments, the PC exhibits a polarization dependent loss (PDL). The PDL is of the order of 0.1 decibel at 1570 nanometers and has a smaller value at 1550 nanometers. Consequently, adjusting the PC changes the pump light 42 power launched into the EDF 20, and thus varies the SFS mean wavelength $\langle\lambda\rangle$. For a PDL at 1480 nanometers of even only 0.02 decibel, the variations of the SFS mean wavelength $\langle\lambda\rangle$ introduced by the PC can be approximately 8 ppm, or even higher (e.g., 10 to 22 ppm).

In other embodiments, a second PC is placed at the output of the SFS 10 at point B in FIG. 1 to measure the dependence of the SFS mean wavelength $\langle\lambda\rangle$ on polarization. Residual PDL in the second PC can cause an erroneously high reading of the instability of the SFS mean wavelength $\langle\lambda\rangle$. To avoid the corresponding PDL effects on the SFS mean wavelength $\langle\lambda\rangle$, certain embodiments avoid using any PCs which would otherwise increase the polarization dependence of the SFS mean wavelength $\langle\lambda\rangle$. In certain such embodiments, as the temperatures of components of the SFS 10 vary over time, the pump light 42 polarization also varies due to temperature-dependent birefringence, but polarization effects are not measured directly.

EDF Temperature-Related Effects

Besides the thermal variations of the birefringence of the EDF 20 or the coupler 30, additional instabilities of the SFS mean wavelength $\langle\lambda\rangle$ can be due to temperature variations of the EDF 20. Variations of the temperature of the EDF 20 can affect the emission and absorption cross-sections of erbium. See, e.g., J. Kemtchou et al., "Absorption and emission cross-sections measurements for temperature dependent modeling of erbium-doped fibers amplifiers," in *Proceedings of Third Optical Fibre Measurement Conference*, Liege, Belgium, Vol. 1, pp. 93-96, 1995, which is incorporated in its entirety by reference herein. These cross-section variations can induce a drift in the mean wavelength of the EDF 20 and a corresponding variation in the SFS mean wavelength $\langle\lambda\rangle$. See, e.g., M. J. F. Digonnet, "Broadband fiber sources," in *Rare-Earth-Doped Fiber Lasers and Amplifiers*, pp. 80-94, 2001, $2^{nd}$ Edition, M. J. F. Digonnet, Ed., Marcel Dekker, Inc., New York, which is incorporated in its entirety by reference herein.

The thermal coefficient of the temperature dependence of the SFS mean wavelength $\langle\lambda\rangle$ depends on characteristics of the EDF 20, as well as the configuration and operating parameters of the SFS 10 (e.g., pump light 42 wavelength and power). Values of the SFS thermal coefficient ranging from −3 to +10 ppm/degree Celsius have previously been measured. See, e.g., D. C. Hall et al., P. Wysocki et al., both cited above, and P. R. Morkel, "Erbium-doped fibre superfluorescent for the fibre gyroscope," in *Optical Fiber Sensors, Springer Proc. in Physics*, Vol. 44, pp. 143-148, 1989, which is incorporated in its entirety by reference herein. In certain embodiments, optical filters can be used to further reduce the thermal coefficient of the temperature dependence of the SFS mean wavelength $\langle\lambda\rangle$. While the temperature dependence of the SFS mean wavelength $\langle\lambda\rangle$ of certain embodiments can be relatively weak, even a temperature dependence of 1 ppm/degree Celsius can lead to unacceptably large variations of the SFS mean wavelength $\langle\lambda\rangle$ in embodiments in which the SFS 10 is required to operate over a wide temperature ranges (e.g., tens of degrees Celsius).

In certain embodiments, the EDF-temperature effects (including the emission and absorption cross-sections of erbium and the temperature-dependent polarization-related effects of the EDF birefringence described above) are reduced by stabilizing the EDF temperature. However, such embodiments typically utilize higher power consumption, longer power-up times, larger sizes, and higher pump source 40 costs to keep the SFS mean wavelength $\langle\lambda\rangle$ at a predetermined value with sufficient stability.

In other embodiments, rather than attempting to keep the SFS mean wavelength $\langle\lambda\rangle$ at a predetermined value, it is sufficient to know the value of the SFS mean wavelength $\langle\lambda\rangle$ at various points in time. The SFS mean wavelength in certain embodiments can be estimated using a measured temperature of the EDF 20.

Figure 2:
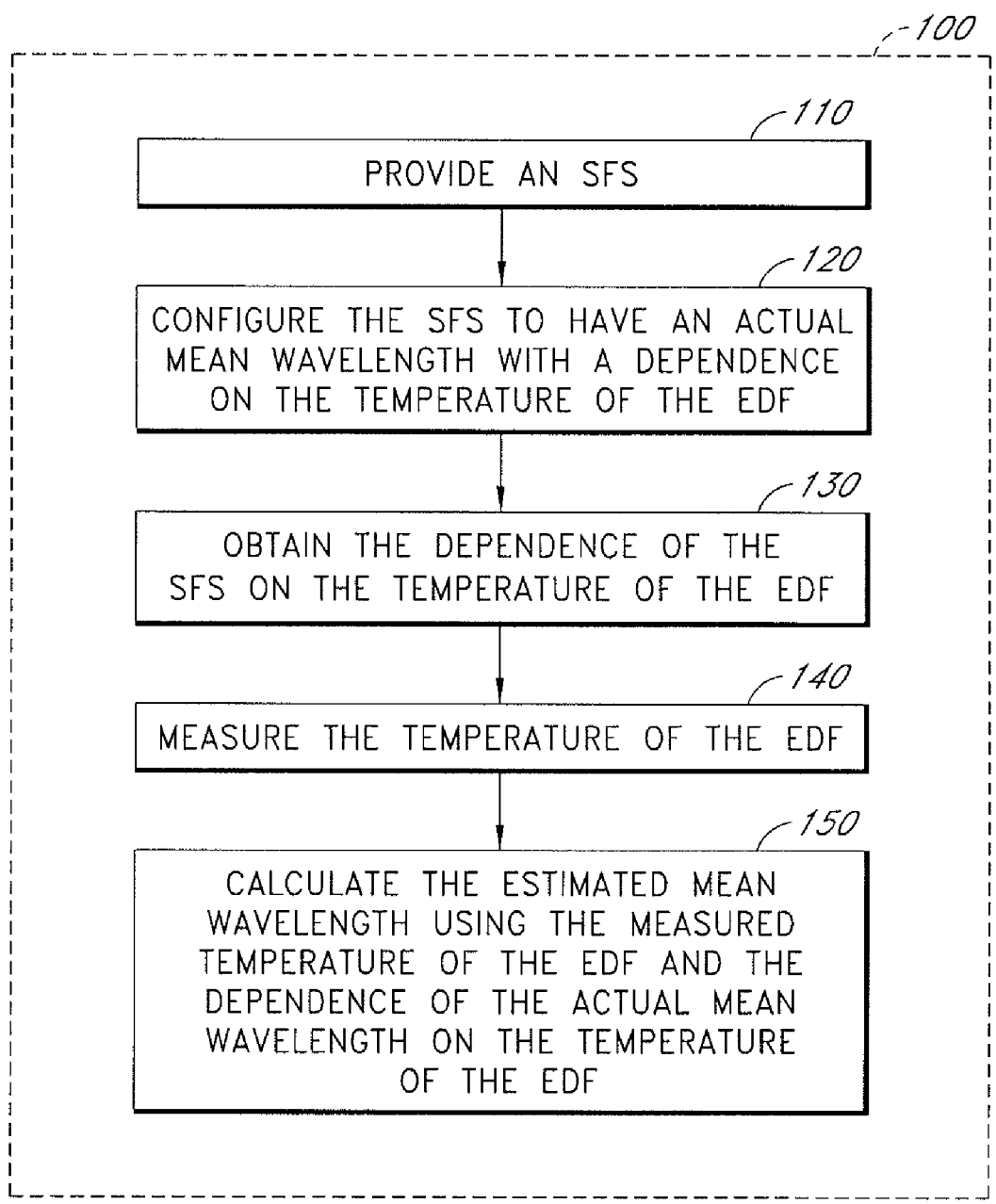
FIG. 2 is a flow diagram of an embodiment of a method of determining an estimated mean wavelength $<\lambda_E>$ of an SFS.

FIG. 2 is a flow diagram of an embodiment of a method 100 of determining an estimated mean wavelength $\langle\lambda_E\rangle$ of an SFS 10 (e.g., estimating variations of the mean wavelength due to variations of the temperature of the EDF 20). The method 100 comprises an operational block 110 in which an SFS 10 is provided. The SFS 10 has an actual mean wavelength $\langle\lambda_A\rangle$ and comprises an EDF 20 having a temperature and a pump source 40. The method 100 further comprises an operational block 120 in which the SFS 10 is configured such that the actual mean wavelength $\langle\lambda_A\rangle$ has a dependence on the temperature of the EDF 20. The method 100 further comprises an operational block 130 in which the dependence of the actual mean wavelength $\langle\lambda_A\rangle$ on the temperature of the EDF 20 is obtained. In certain embodiments, obtaining the dependence of the actual mean wavelength on the temperature of the EDF 20 comprises measuring the temperature dependence. In other embodiments, obtaining the dependence of the actual mean wavelength on the temperature of the EDF 20 comprises obtaining the temperature dependence from another source (e.g., accessing the results of a previous measurement of the temperature dependence). The method 100 further comprises an operational block 140 in which the temperature of the EDF 20 is measured. The method 100 further comprises the operational block 150 in which the estimated mean wavelength $\langle\lambda_E\rangle$ is calculated using the measured temperature of the EDF 20 and the dependence of the actual mean wavelength $\langle\lambda_A\rangle$ on the temperature of the EDF 20.

In certain embodiments, the method 100 does not comprise controlling the temperature of the EDF 20, while in other embodiments, the method 100 comprises controlling the temperature of the EDF 20 to have a predetermined stability (e.g., to be stable within ±0.5 degree Celsius). While certain embodiments of the method 100 do not prevent the actual mean wavelength $\langle\lambda_A\rangle$ from drifting with temperature, such embodiments enable the estimated mean wavelength $\langle\lambda_E\rangle$ to be calculated at any time. The SFS 10 is preferably configured so that variations of the actual mean wavelength $\langle\lambda_A\rangle$ are primarily due to variations in the temperature of the EDF 20.

If the actual mean wavelength $\langle\lambda_A\rangle$ has appreciable contributions from other temperature-dependent effects (e.g., polarization-related effects such as fiber birefringence), variations in the temperature or in the temperature gradients can also affect other components of the SFS 10. In such embodiments, the correlation of the actual mean wavelength $\langle\lambda_A\rangle$ to the temperature of the EDF 20 is reduced, such that the estimated mean wavelength $\langle\lambda_E\rangle$ is a poorer approximation to the actual mean wavelength $\langle\lambda_A\rangle$. See, e.g., M. J. F. Digonnet, "Broadband fiber sources," in *Rare-Earth-Doped Fiber Lasers and Amplifiers*, pp. 80-94, 2001, cited above.

FIRST EXEMPLARY EMBODIMENT

The following exemplary embodiment illustrates the correlation of the estimated mean wavelength $\langle\lambda_E\rangle$ with the actual mean wavelength $\langle\lambda_A\rangle$ for an embodiment in which no attempts were made to control the ambient temperature or the temperature of the SFS 10. The SFS 10 was placed on an optical table, and an optical spectrum analyzer (OSA) was used to record the output spectrum of the SFS 10 (and hence the actual mean wavelength $\langle\lambda_A\rangle$) every 19 seconds for 50 hours. The OSA used was Model No. AQ6327B, manufactured by Ando Electric Co., Ltd. of Kawasaki, Kanagawa, Japan. The ambient temperature was measured and the estimated mean wavelength $\langle\lambda_E\rangle$ was calculated.

Figure 3:
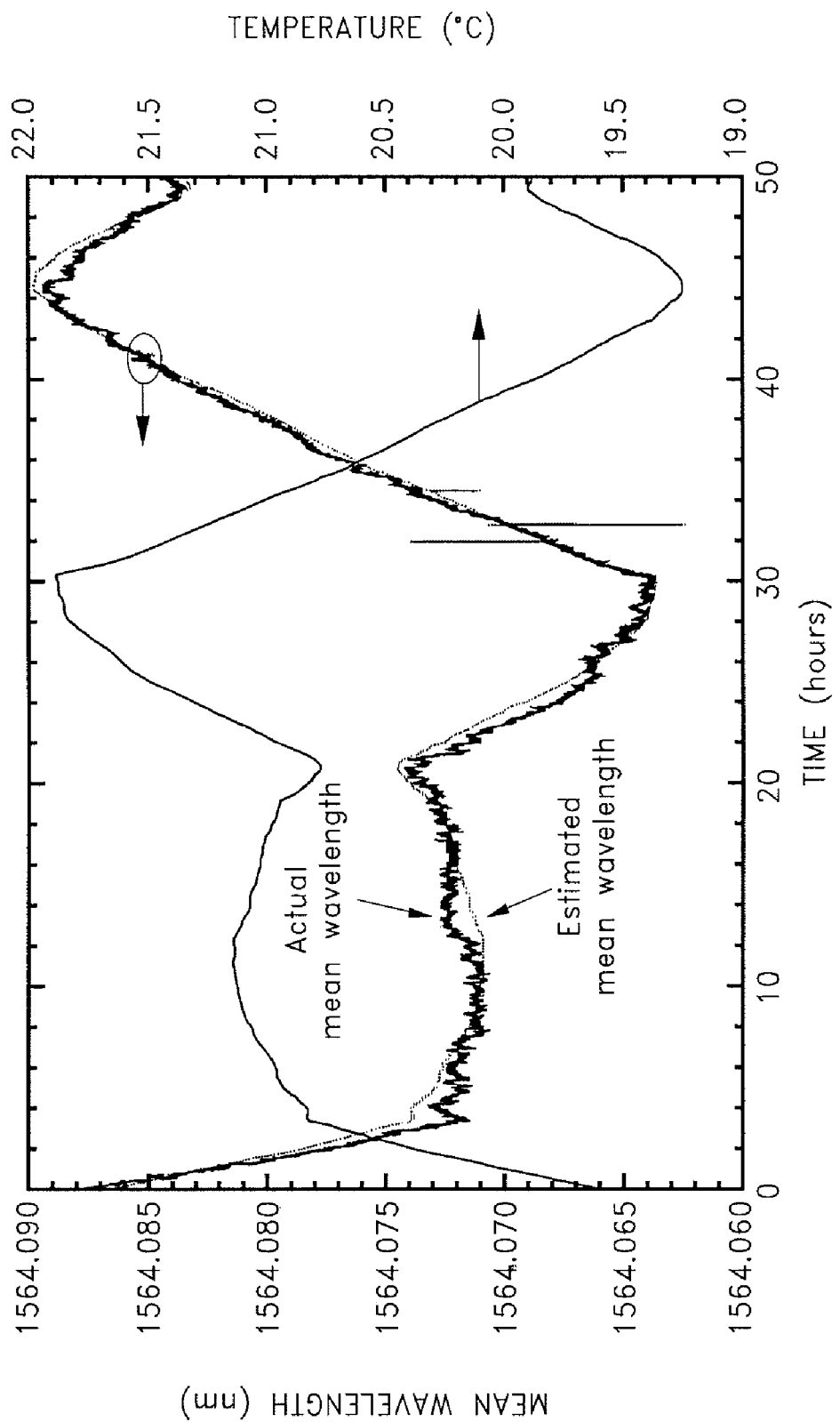
FIG. 3 is a plot of the measured actual mean wavelength $<\lambda_A>$ and the measured ambient temperature T as functions of time during a 50-hour run.

FIG. 3 is a plot of the measured actual mean wavelength $\langle\lambda_A\rangle$ and the measured ambient temperature T as functions of time during the 50-hour run. In certain embodiments, the temperature $T_{EDF}$ of the EDF 20 is assumed to be approximately equal to the measured ambient temperature T. The measured ambient temperature T, and hence the measured temperature $T_{EDF}$ of the EDF 20, varied over a range of approximately 2.6 degrees Celsius during the 50 hours of the run. As expected, the measured actual mean wavelength $\langle\lambda_A\rangle$ also varied substantially (e.g., ±8 ppm).

Figure 4:
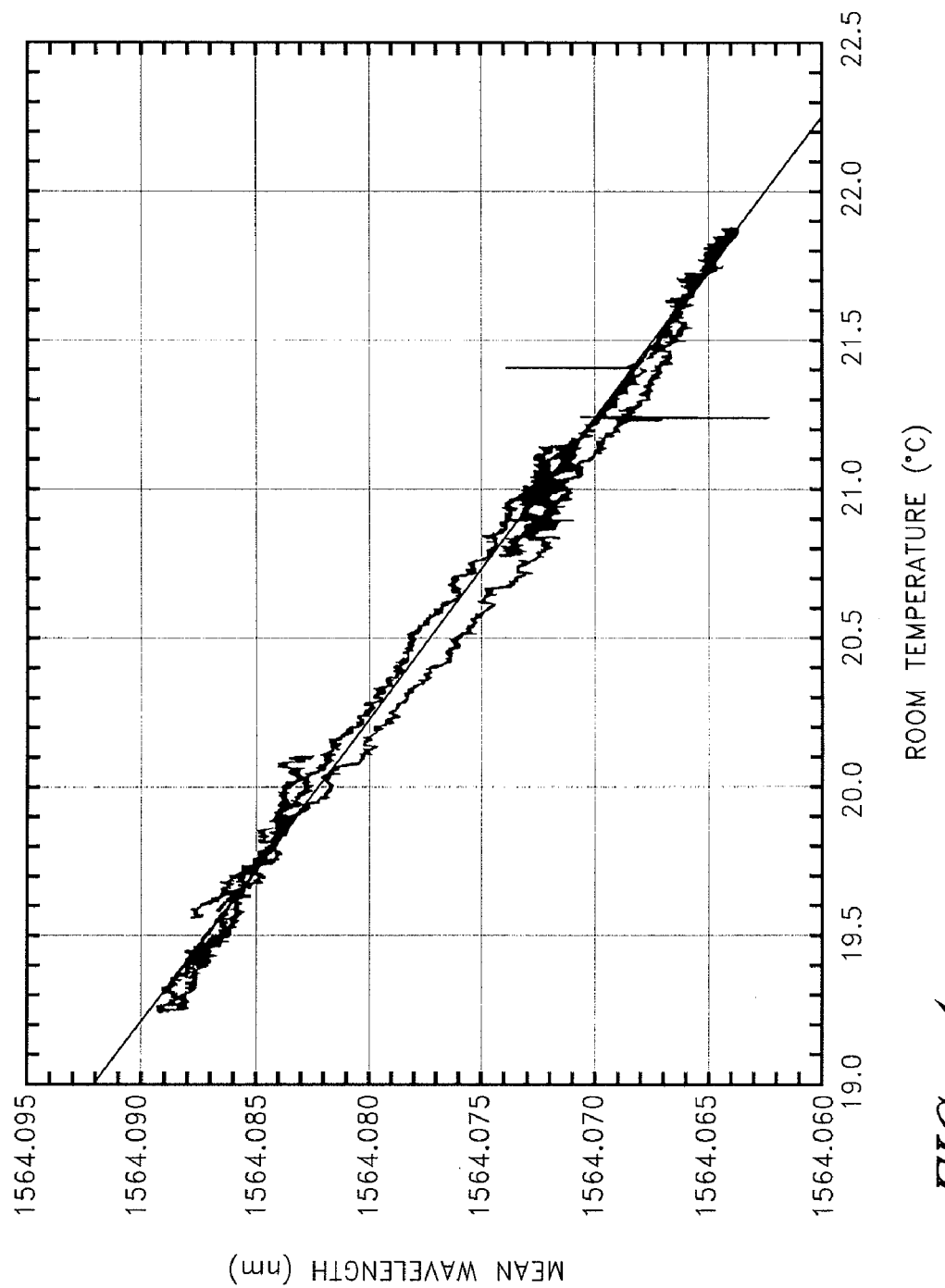
FIG. 4 plots the measured actual mean wavelength $<\lambda_A>$ as a function of the measured ambient temperature T.

The actual mean wavelength $\langle\lambda_A\rangle$ and the measured ambient temperature T are obviously strongly correlated with one another in FIG. 3. FIG. 4 plots the measured actual mean wavelength $\langle\lambda_A\rangle$ as a function of the measured ambient temperature T. The measured actual mean wavelength $\langle\lambda_A\rangle$ is shown to vary almost linearly with the measured temperature T. Such behavior is expected for small perturbations, as described more fully by D. G. Falquier et al., November 2000, cited above. The small amount of hysteresis illustrated by FIG. 4 is likely due to a slight lag between the measured ambient temperature T and the actual temperature $T_{EDF}$ of the EDF 20.

A linear fit of the measured actual mean wavelength $\langle\lambda_A\rangle$ as a function of the measured ambient temperature T is illustrated in FIG. 4 by a straight solid line. Assuming the temperature $T_{EDF}$ of the EDF 20 is approximately equivalent to the measured ambient temperature T, the dependence of the actual mean wavelength $\langle\lambda_A\rangle$ on the temperature $T_{EDF}$ of the EDF 20 is thus characterized by the equation of this line, e.g., by the following equation:

$$\langle\lambda_A\rangle = 1564.28055 - 0.0099149 T_{EDF}, \quad (1)$$

where the actual mean wavelength $\langle\lambda_A\rangle$ has units of nanometers and the temperature $T_{EDF}$ of the EDF 20 has units of degrees Celsius. The thermal coefficient of the temperature-dependent SFS mean wavelength $\langle\lambda\rangle$ is thus −0.0099 nanometer/degree Celsius, or −6.3 ppm/degree Celsius. Such magnitudes of the temperature dependence of the SFS mean wavelength are consistent with earlier reported values. See, e.g., D. C. Hall et al. (cited above). Also, see, P. F. Wysocki et al., "Broadband Fiber Sources for Gyros," in *SPIE Proceedings on Fiber Optic Gyros: 15th Anniversary*, Vol. 1585 (SPIE, Washington, 1991), pp. 371-382, which is incorporated in its entirety by reference herein.

Figure 5:
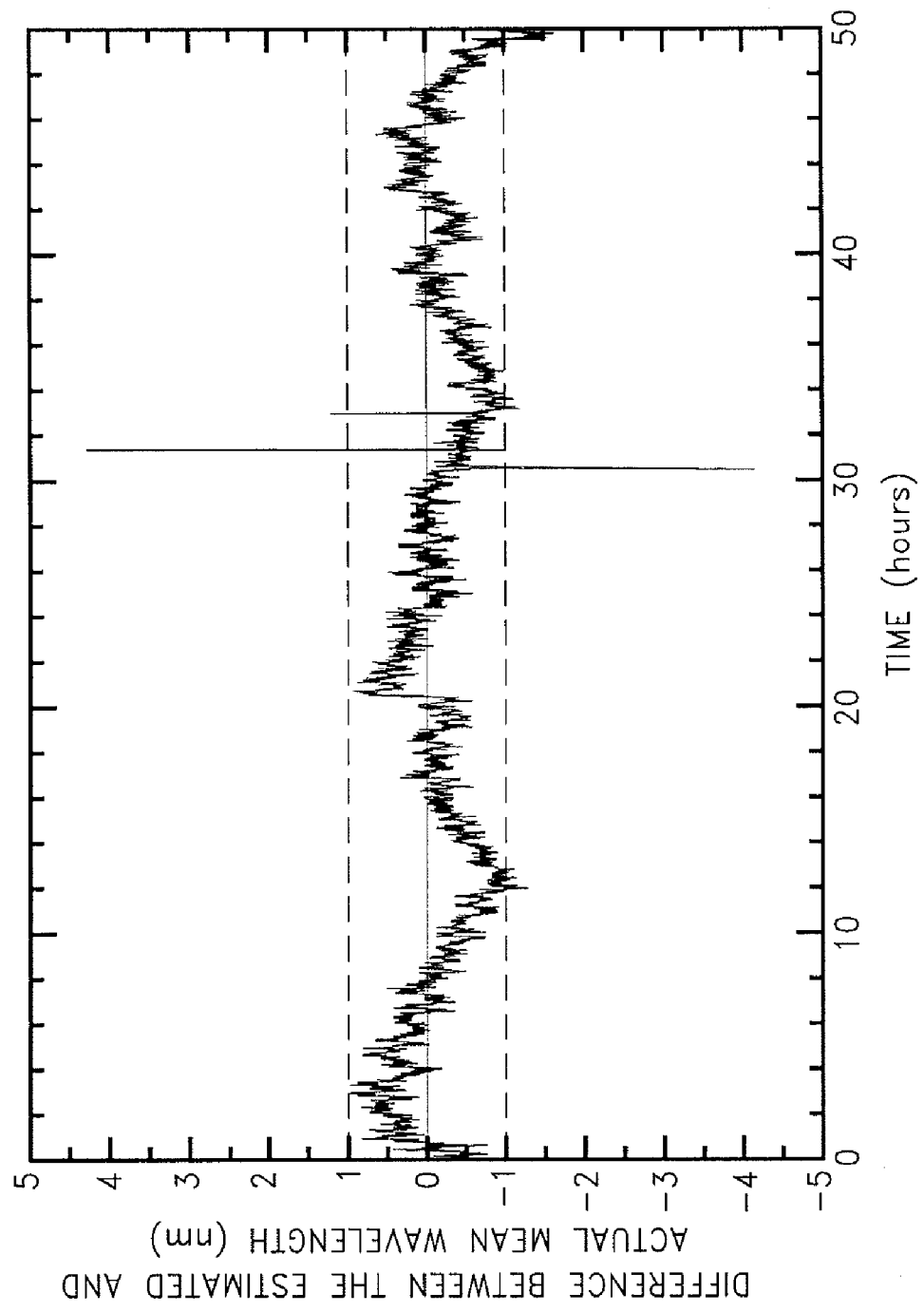
FIG. 5 is a plot of the difference between the estimated mean wavelength $<\lambda_E>$ and the measured actual mean wavelength $<\lambda_A>$ of FIG. 4 as a function of time.

In this exemplary embodiment, the measured temperature $T_{EDF}$ of the EDF 20 and the dependence of the actual mean wavelength $\langle\lambda_A\rangle$ on the temperature $T_{EDF}$ of the EDF 20 were used to calculate an estimated mean wavelength $\langle\lambda_E\rangle$. Substituting the temperature $T_{EDF}$ of the EDF 20 into Equation 1 yielded an estimated mean wavelength $\langle\lambda_E\rangle$ illustrated by the dotted curve of FIG. 3. FIG. 5 illustrates the difference between the estimated mean wavelength $\langle\lambda_E\rangle$ and the measured actual mean wavelength $\langle\lambda_A\rangle$. As shown by FIG. 5, the difference between the estimated and actual mean wavelengths is within approximately ±1 ppm for the full 50 hours of the run.

Figure 6:
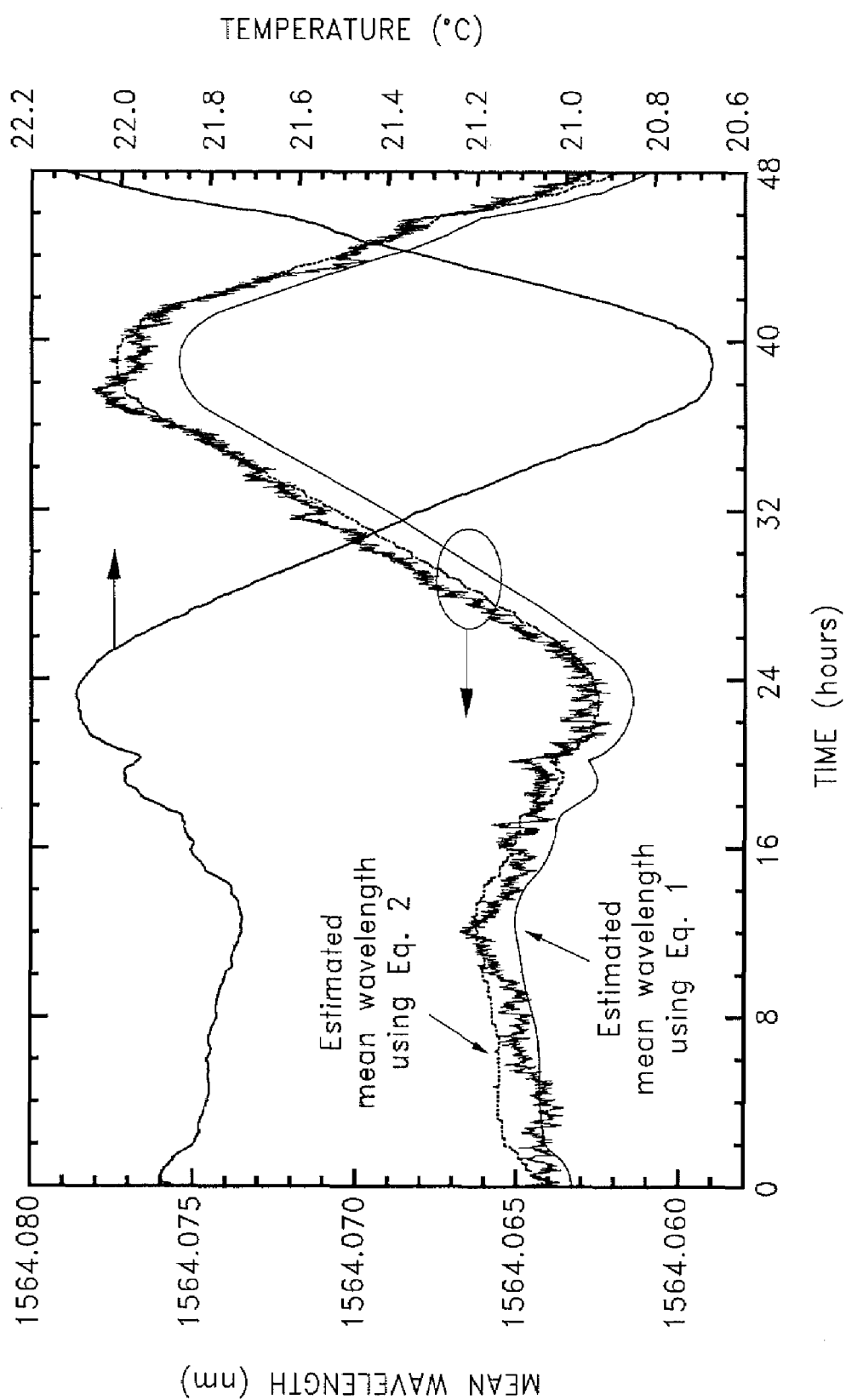
FIG. 6 is a plot of the difference for a second set of measurements taken nine days after the measurement represented in FIG. 5, in which the actual mean wavelength $<\lambda_A>$ and the ambient temperature T were measured over a 48-hour period.

In this exemplary embodiment, the same measurements were repeated nine days later, in which the actual mean wavelength $\langle\lambda_A\rangle$ and the ambient temperature T were measured over a 48-hour period. FIG. 6 illustrates these measured values versus time. A linear regression of the measured actual mean wavelength $\langle\lambda_A\rangle$ versus the temperature $T_{EDF}$ of the EDF 20 (taken to be approximately equivalent to the measured ambient temperature T) resulted in the following equation:

$$\langle\lambda_A\rangle = 1564.29458 - 0.010503 T_{EDF}. \quad (2)$$

Figure 7:
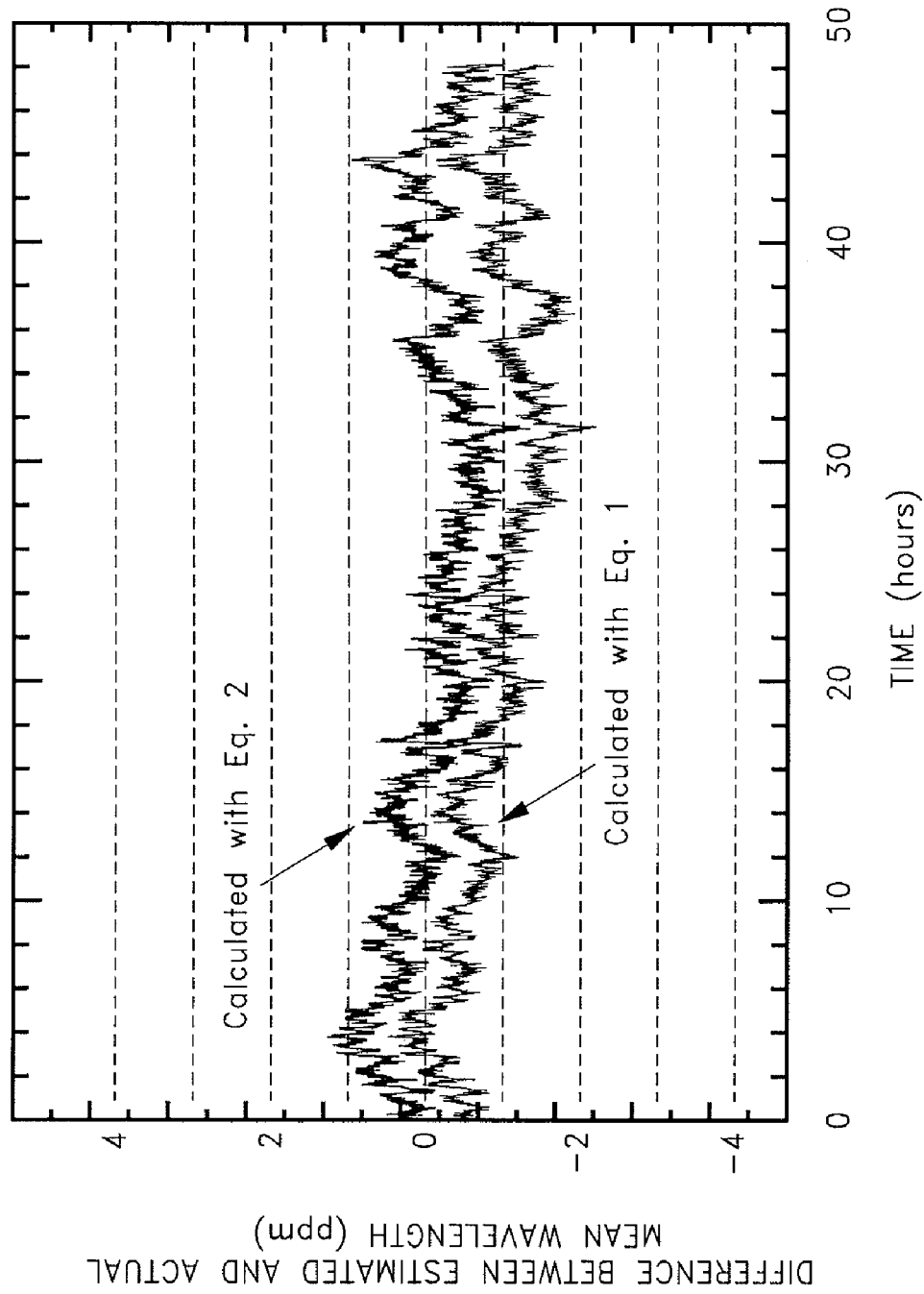
FIG. 7 is a plot of the difference between the estimated mean wavelength $<\lambda_E>$ and the actual mean wavelength $<\lambda_A>$ of FIG. 6 as a function of time.

Again, the measured actual mean wavelength $\langle\lambda_A\rangle$ and the measured temperature T are strongly correlated (see FIG. 6). Using the measured temperature $T_{EDF}$ of the EDF 20 and the dependence of the actual mean wavelength $\langle\lambda_A\rangle$ on the temperature $T_{EDF}$ of the EDF 20 as expressed by Equation 2, an estimated mean wavelength $\langle\lambda_E\rangle$ was calculated. The curve labeled "Estimated mean wavelength using Eq. 2" of FIG. 6 illustrates this estimated mean wavelength $\langle\lambda_E\rangle$, which agrees very well with the measured actual mean wavelength $\langle\lambda_A\rangle$. The line labeled "Calculated with Eq. 2" of FIG. 7 illustrates the difference between this estimated mean wavelength $\langle\lambda_E\rangle$ and the actual mean wavelength $\langle\lambda_A\rangle$ as a function of time. This difference remained within approximately ±1 ppm for the full 48 hours of the run.

In embodiments in which the SFS 10 is used as the source for a FOG, the actual mean wavelength of the SFS 10, and hence the gyro scale factor, can be evaluated using the algorithm of FIG. 2 while the FOG is running. Such embodiments measure the temperature of the EDF 20 and determine an estimated mean wavelength while the FOG is running, as described above. However, the temperature dependence of the mean wavelength would typically not be measured in real time, but would be measured beforehand. To evaluate how well such embodiments would work, the estimated mean wavelength $\langle\lambda_E\rangle$ was calculated for the second run, not by using the temperature dependence of Equation 2 (which was measured during the second run), but by using the temperature dependence of Equation 1 (which was measured nine days previously). The resultant estimated mean wavelength $\langle\lambda_E\rangle$ is illustrated in FIG. 6 as the curve labeled "Estimated mean wavelength using Eq. 1." This curve has nearly the same form as the form of the curve estimated using Equation 2, but the curve for the "Estimated mean wavelength using Eq. 1" is shifted towards shorter wavelengths. This shift has a mean value of 0.0013 nanometer, corresponding to approximately 1 ppm. Due to this shift, the resultant difference of the estimated and actual mean wavelengths, illustrated in FIG. 7 by the curve labeled "Calculated with Eq. 1," is slightly worse than the resultant difference calculated using Equation 2, but it still remains within approximately ±2 ppm over the full 48 hours of the run.

The offset between the two curves of FIG. 7 originates from the slight difference between the temperature dependence of the first run (Equation 1) and the temperature dependence of the second run measured nine days later (Equation 2). The SFS 10 was left untouched between the two runs, so the offset was likely primarily the result of a drift in the absolute wavelength reading of the OSA, the temperature of which was not controlled.

Using the OSA to measure the spectrum of the broadband source, a short-term noise of approximately 0.5 to 1 ppm was measured. With a highly stable 1.55-micron laser diode as a source, and after a warm-up time of approximately 2 hours, the OSA long-term reading remained within approximately ±5 ppm for room temperature variations under approximately ±3 degrees Celsius. As explained more fully below, this variation of the OSA long-term reading is expected to be slightly lower for a broadband light source, e.g., approximately ±1 ppm/degree Celsius. The difference between the temperature dependencies of Equation 1 and Equation 2 could therefore easily have been caused by variable temperature gradients between the OSA and the surrounding room. Residual fluctuations in the difference between the estimated and actual mean wavelengths as shown in FIGS. 5 and 7 were at least partly due to instabilities in the OSA, as well as due to non-linearities in the temperature dependence.

As illustrated by this exemplary embodiment, the method 100 of FIG. 2 is successful in estimating the mean wavelength within an approximate ±2 ppm accuracy over a 48-hour period. In addition, the accuracy can be improved by improving the stability of the OSA used to measure the actual mean wavelength $\langle \lambda_A \rangle$. Furthermore, this exemplary embodiment illustrates that by measuring the ambient temperature over time (which is assumed to be close to the temperature of the EDF 20), and correcting the measured mean wavelength for known thermal drift, the mean wavelength of the SFS 10 can be estimated to within approximately ±1 ppm over a time period of 98 hours. This stability represents an important step towards a practical high-grade FOG.

SECOND EXEMPLARY EMBODIMENT

The first exemplary embodiment described above illustrates that after correction of temperature variations of the EDF 20, the SFS mean wavelength $\langle \lambda \rangle$ is stable to within approximately ±2 ppm. The first exemplary embodiment does not provide information regarding the stability of the SFS mean wavelength $\langle \lambda \rangle$ if the temperature of the SFS 10 were controlled to be stable. In embodiments in which the temperature of the SFS 10 is controlled to be stable, the stability of the SFS mean wavelength $\langle \lambda \rangle$ would likely be better than approximately ±2 ppm, since stabilizing the temperature of the SFS 10 would not only eliminate the thermal drift of the EDF 20, but other thermal effects as well (e.g., fiber birefringence drifts and the corresponding residual polarization-related effects).

The following exemplary embodiment illustrates the correlation of the estimated mean wavelength $\langle \lambda_E \rangle$ with the actual mean wavelength $\langle \lambda_A \rangle$ for an embodiment in which the temperature of the SFS 10 was kept relatively stable. The SFS 10 in the following embodiment was substantially identical to the SFS 10 described above for the first exemplary embodiment, except that an EDF 20 having a lower thermal coefficient was used. All parameters of the pump source 40 were controlled to the same tolerance as described above for the first exemplary embodiment. The small-signal absorption of the EDF 20 at 1.53 microns was comparable to that of the EDF 20 (i.e., approximately 348 decibels) of the first exemplary embodiment, and forward ASE light 44 was also greatly suppressed in this second exemplary embodiment.

To reduce the temperature fluctuations, the EDF 20 and the WDM coupler 30 were both placed in a Styrofoam[7] enclosure. The room temperature was not tightly controlled, but the room was kept closed to minimize air currents. The room temperature was estimated to be stable to within approximately ±0.5 degree Celsius.

As described above with regard to the first exemplary embodiment, the wavelength stability of the pump source 40 exceeds the stability of the state-of-the-art commercial optical spectrum analyzers (OSAs) used to measure the output light from the SFS 10. To correct for the OSA long-term fluctuations, the OSA was calibrated using the configuration 200 schematically illustrated by FIG. 8. The output light from the SFS 10 being tested and the signal from a stable wavelength reference source 210 were both transmitted through non-polarization-maintaining (non-PM) fiber pigtails 220 and mixed in a fiber coupler 230 (i.e., a LiNbO$_3$ 1×2 coupler). The reference source 210 was a temperature-controlled communication-grade distributed feedback (DFB) laser diode (1541.74 nanometers) with a stability of approximately 0.001 nanometer (approximately 0.7 ppm). The mixed light from the coupler 230 was then transmitted through a polarization-maintaining (PM) fiber pigtail 240 to the OSA 250. The OSA 250 is connected to a signal processor 252 (e.g., computer) and a display 254.

The display 254 of the OSA 250 shows the reference wavelength of the reference source 210 superimposed onto the output spectrum from the SFS 10, thereby providing an absolute calibration of the wavelength scale of the OSA 250. For wavelength drifts in the OSA which are substantially uniform across the whole spectrum of the SFS 10 (e.g., approximately 1520 nanometers to approximately 1580 nanometers), this configuration for calibration of the wavelength scale of the OSA 250 is independent of wavelength drifts. The response of the OSA 250 is dependent on the polarization of the detected light, so it is desirable to ensure that the polarization of the light signal detected by the OSA 250 does not vary over time. This result was accomplished by using a coupler 230 comprising a lithium niobate (LiNbO$_3$) Y-junction with a polarization-maintaining (PM) fiber pigtail, which acted as a polarizer.

Figure 9:
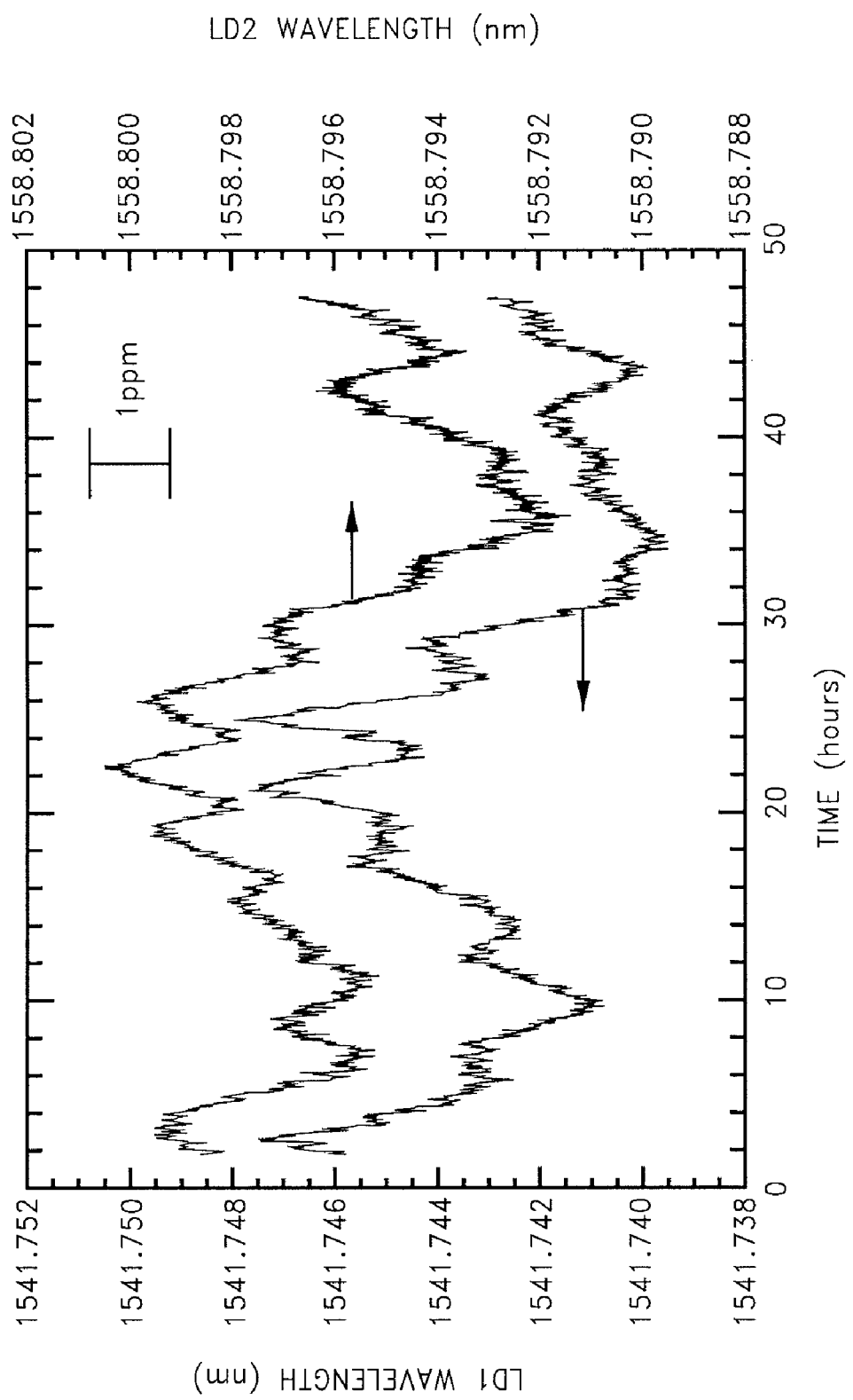
FIG. 9 illustrates the mean wavelengths, recorded simultaneously, of the laser diode of the reference source (LD1) and a second laser diode (LD2).

The effectiveness of this calibration scheme and the validity of the assumption regarding the uniformity of the wavelength drift were checked by replacing the SFS 10 by a second DFB laser diode of similar stability and wavelength as the reference laser diode 210. FIG. 9 illustrates the mean wavelengths, recorded simultaneously, of the laser diode of the reference source 210 (LD1) and the second DFB laser diode (LD2). Both laser diodes exhibit (1) short-term noise; (2) quasi-periodic oscillations with a period of approximately 3-4 hours and a peak-to-peak amplitude of approximately 0.002 nanometer; and (3) overall quasi-periodic oscillations with a period of approximately 24 hours and a peak-to-peak amplitude of approximately 0.005 nanometer.

Figure 10:
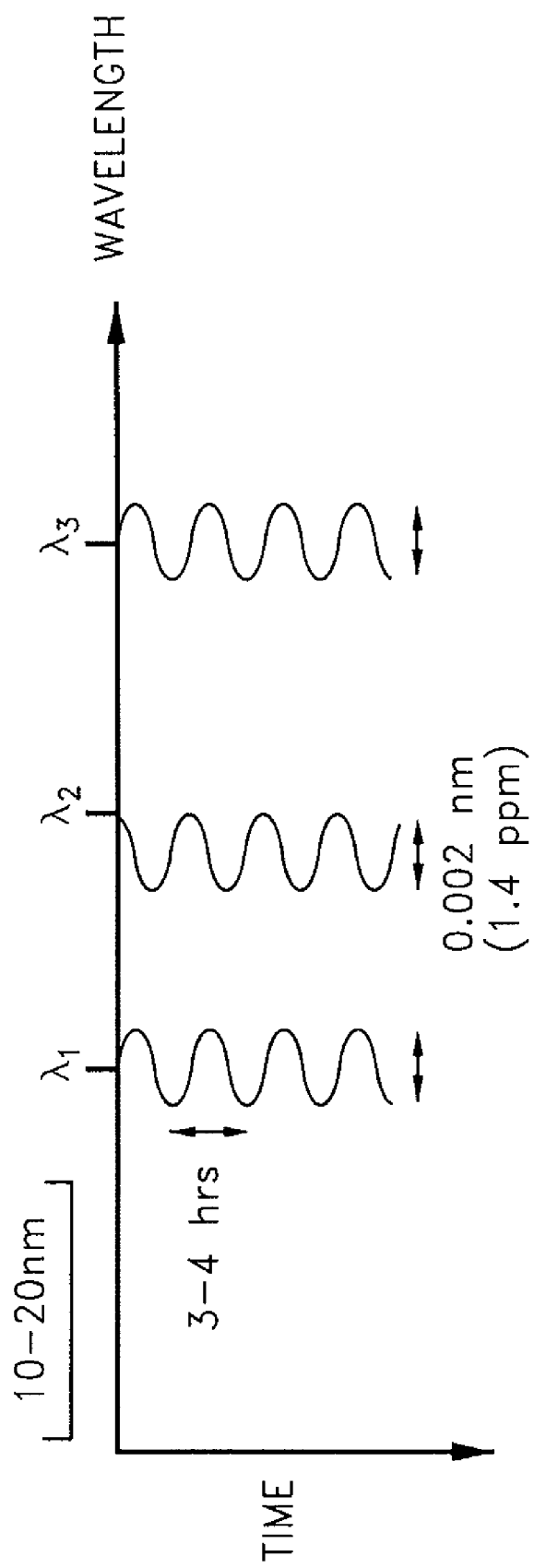
FIG. 10 schematically illustrates a possible cause of the 3-hour to 4-hour fluctuations of the OSA readings.

Each of these three components of the temporal behavior of the wavelength fluctuations has a comparable magnitude for the two laser diodes LD1 and LD2. Each component is a manifestation of the OSA fluctuations on a respective time scale. FIG. 10 schematically illustrates an explanation of the 3-hour to 4-hour fluctuations of the drift component of the OSA readings. At a wavelength $\lambda_1$, the OSA reading fluctuates quasi-periodically with a period of approximately 3 to 4 hours and an amplitude of approximately 0.002 nanometer. At a different wavelength ($\lambda_2$ or $\lambda_3$), the fluctuations have a comparable period and amplitude, but have a different phase than the fluctuations at $\lambda_1$. This behavior is consistent with the two wavelengths of FIG. 9, which have 3-hour to 4-hour fluctuations which are approximately out of phase with one another. This explanation is also consistent with the observation that the 3-hour to 4-hour fluctuations are not present in OSA readings of the SFS mean wavelength. The spectrum from the SFS 10 is broad enough (greater than approximately 10 nanometers) that these fluctuations are averaged out.

Figure 11:
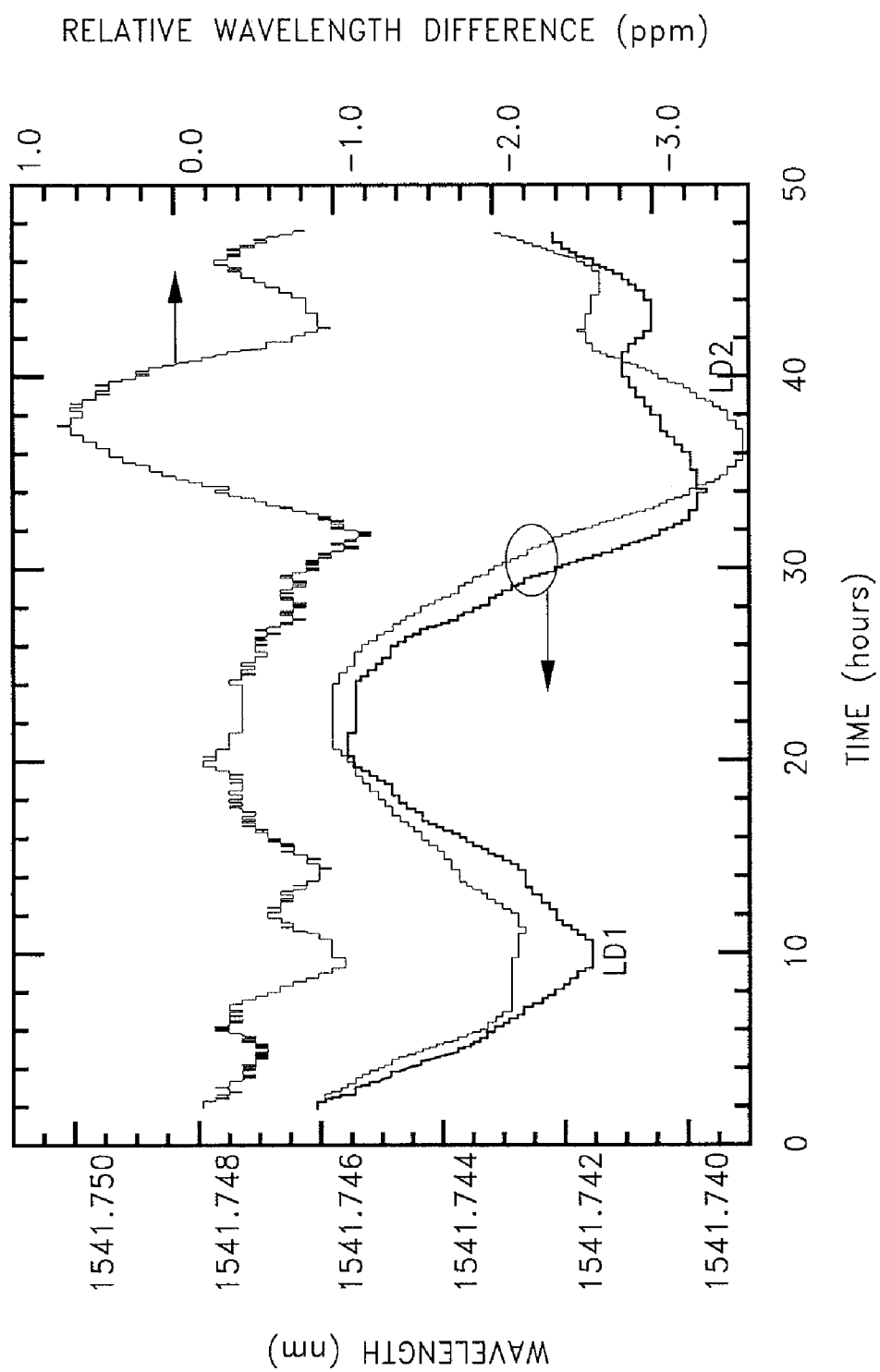
FIG. 11 is a plot of the mean wavelengths of the two laser diodes and of the difference between the two wavelengths.

The drift component of the OSA readings with a period of approximately 24 hours may arise from periodic variations in the OSA temperature. To investigate this possibility, each of the two curves in FIG. 9 was averaged out using a ±3.5-hour time window to eliminate the 3-hour to 4-hour component of the OSA fluctuations. The resultant smoothed curves are shown in FIG. 11, in which the curve for laser diode LD2 was translated by approximately 17 nanometers to bring it in the vicinity of the LD1 curve. It is apparent from FIG. 11 that the 24-hour oscillations of the two laser diodes are strongly correlated. FIG. 11 also includes the difference between these two curves, which is shown to be constant within approximately ±1 ppm. Therefore, using the calibration process of FIG. 8 reduces the OSA long-term drift substantially from its original approximately ±5-ppm value.

Figure 8:
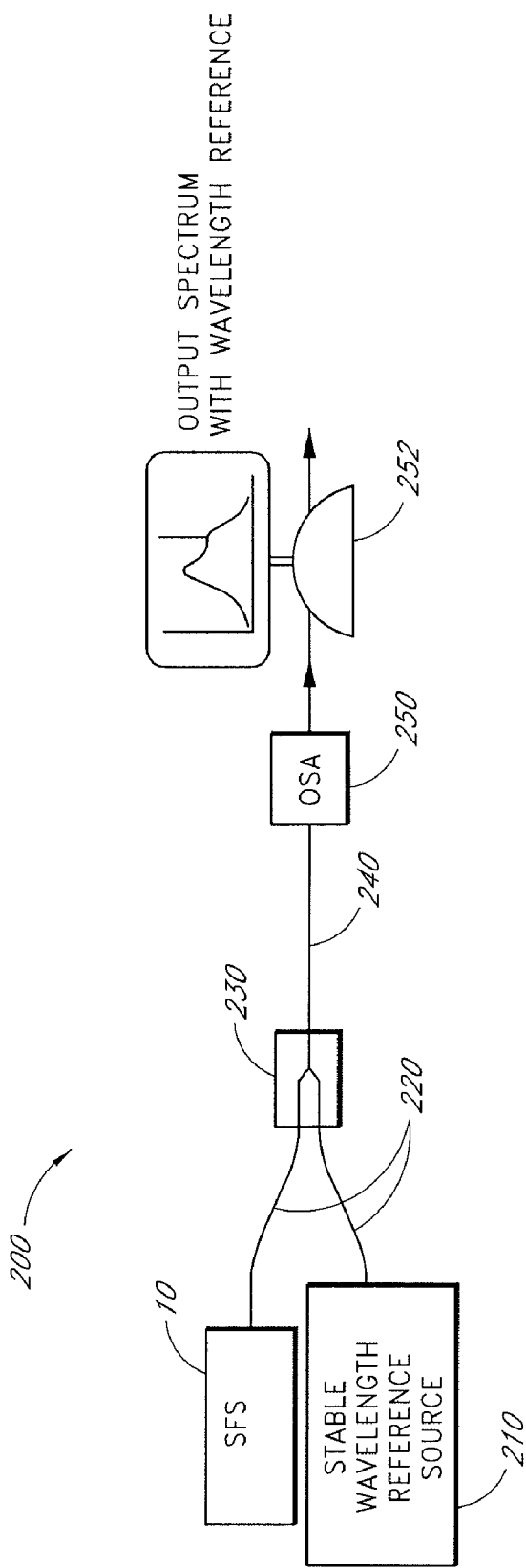
FIG. 8 schematically illustrates one configuration for correcting for the long-term fluctuations in the wavelength measurements of the optical spectrum analyzer (OSA).
Figure 12:
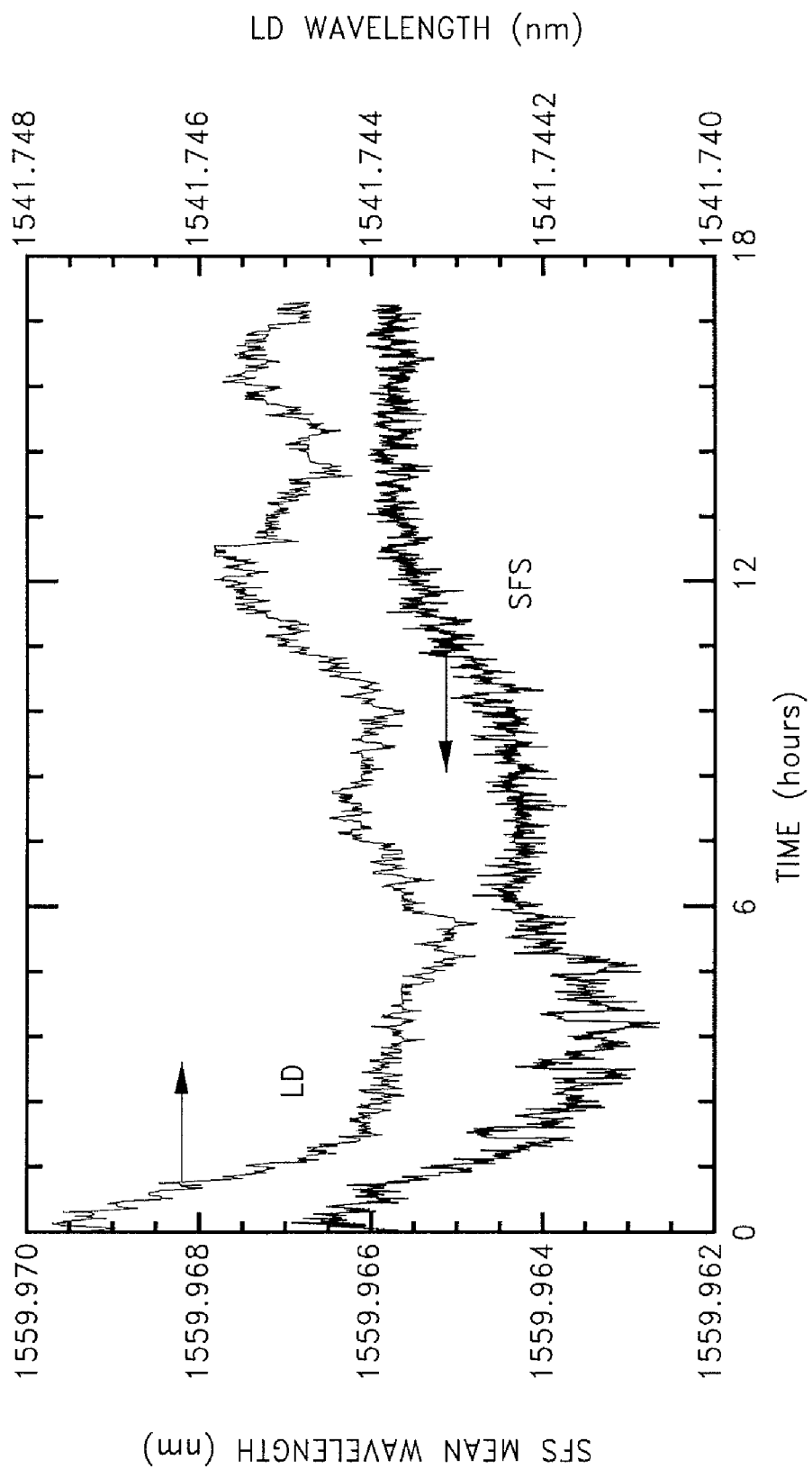
FIG. 12 illustrates the two resultant curves for the mean wavelength of the SFS and the wavelength of the laser diode (LD).

The configuration illustrated by FIG. 8 was used to simultaneously measure the variations of the mean wavelength of the SFS 10 and of the wavelength of the reference laser diode 210 for 17 hours. FIG. 12 illustrates the two resultant curves for the mean wavelength of the SFS 10 and the wavelength of the laser diode (LD). The LD wavelength curve was smoothed with a few-hour integration window, as described above. As expected, the long-term variations of the two curves are correlated, which indicates that much of the variations in the SFS mean wavelength are due to drifts of the OSA.

Figure 13:
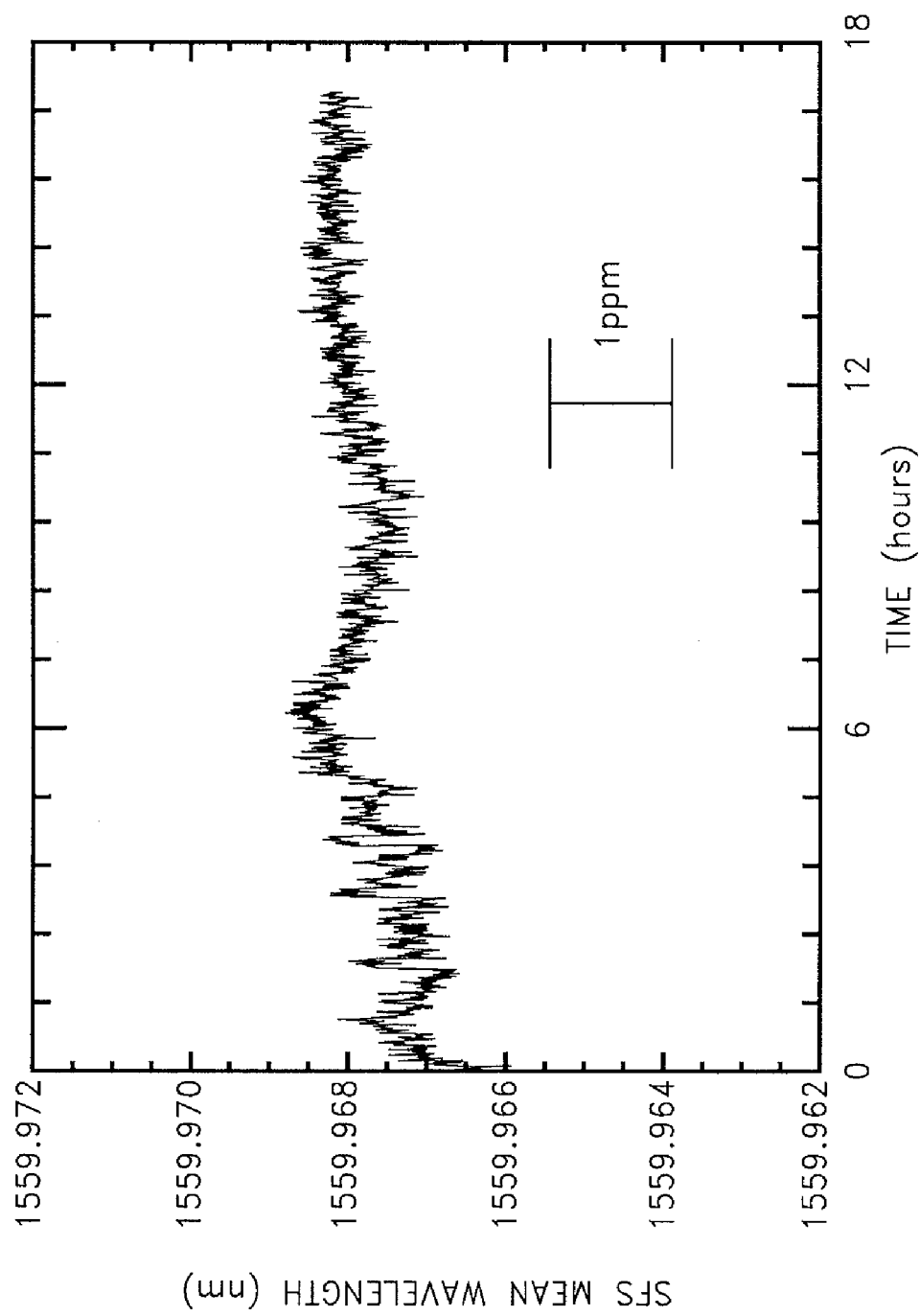
FIG. 13 is a plot of the mean wavelength of the SFS after subtracting the LD curve.

In certain embodiments, it is preferable to remove the contribution of the OSA long-term drift from the mean wavelength of the SFS 10. FIG. 13 displays the mean wavelength of the SFS 10 after subtracting the LD wavelength curve. The resultant curve shows that the SFS 10 exhibits a mean wavelength stability of approximately ±0.5 ppm over a period of 17 hours. In certain other embodiments, the SFS 10 exhibits a mean wavelength stability of approximately ±0.5 ppm over a period of one hour.

The short-term noise of the mean wavelength of the SFS 10 illustrated in FIG. 13 is under approximately ±0.35 ppm, which is limited by the OSA performance. Since the SFS temperature variations during this run were estimated to be at least approximately ±0.5 degree Celsius, the thermal coefficient of this SFS 10 was at most approximately 0.7 ppm/ degree Celsius, or about one order of magnitude smaller than the first SFS 10. This value of the thermal coefficient of the SFS 10 falls within the range of previously reported values. See, e.g., D. C. Hall et al., P. Wysocki et al., June 1991, and P. R. Morkel, each of which is cited above. The thermal coefficient of the SFS 10 has a complex dependence on many parameters (e.g., the temperature dependence of the erbium cross-section spectra) which are difficult to measure. It is therefore generally difficult to predict the thermal coefficient theoretically, or to justify why one fiber performs better than another.

In the exemplary embodiments described above, the stability of the mean wavelength of the SFS 10 was not tested against all possible states of polarization (SOPs) of the pump light 42 or the ASE light 44, 46. Such tests would typically utilize polarization controllers, which introduce PDL effects on the mean wavelength, and artificially increase the instability of the mean wavelength of the SFS 10. Nevertheless, the first and second exemplary embodiments illustrate unambiguously that with SFS temperature excursions of approximately ±0.5 degree Celsius, the birefringence in the SFS 10 is stable enough to attain a mean wavelength stability of approximately ±0.5 ppm. When temperature fluctuations are larger, the mean wavelength of the SFS 10 can be calculated to within approximately ±2 ppm of its actual value by measuring the temperature of the SFS 10. The resultant stability of the mean wavelength is probably limited by the stability of the instrument used to measure the mean wavelength. It is thus possible to stabilize an Er-doped SFS 10 to meet the accuracy requirements of inertial navigation FOGs.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of stabilizing the mean wavelength of light generated by a superfluorescent fiber source (SFS), the method comprising:
   providing a SFS having a mean wavelength influenced by a pump light wavelength, the SFS comprising a doped fiber having a first end, a second end, and a length between the first end and the second end;
   pumping the fiber with pump light from a pump source having a wavelength dependent on the temperature of the pump source and dependent on the power of the pump light; and
   optimizing the length of the fiber to reduce the influence of the pump light wavelength on the stability of the mean wavelength, wherein optimizing the length of the fiber comprises selecting the length to compromise between reduction of the dependence of the mean wavelength on the pump light power and reduction of the contribution of forward amplified spontaneous emission light produced by the fiber to the output light.

2. The method of claim 1, wherein the first end of the fiber is optically coupled to a mirror and the pump source, and the second end of the fiber is optically coupled to an optical isolator.

3. The method of claim 1, wherein the method further comprises reducing variations of the temperature of the fiber.

4. The method of claim 1, wherein the method further comprises estimating variations of the mean wavelength due to variations of the temperature of the fiber.

5. The method of claim 1, wherein reducing the influence of the pump light wavelength on the stability of the mean wavelength comprises reducing variations of the temperature of the pump source.

6. The method of claim 1, wherein reducing the influence of the pump light wavelength on the stability of the mean wavelength comprises tuning the pump source to a wavelength at which a first-order dependence of the mean wavelength on the pump light wavelength is small or substantially zero.

7. A superfluorescent fiber source (SFS) configured to generate output light having a mean wavelength influenced by a pump light wavelength, the SFS comprising:
   a doped fiber having a first end, a second end, and a length between the first end and the second end, the fiber responsive to pump light by producing forward amplified spontaneous emission light and backward amplified spontaneous emission light;

a pump source optically coupled to the first end of the fiber, the pump source producing pump light having a wavelength dependent on the temperature of the pump source and dependent on the power of the pump light; and a mirror optically coupled to the first end of the fiber and configured to reflect the backward amplified spontaneous emission light to the fiber, the fiber amplifying the reflected light, wherein output light from the fiber comprising the forward amplified spontaneous emission light and the reflected and amplified light is transmitted through the second end of the fiber, wherein the mean wavelength of the output light has a stability selected by optimizing the length of the fiber to reduce the influence of the pump light wavelength on the mean wavelength, wherein the length is optimized to compromise between reduction of the dependence of the mean wavelength on the pump light power and reduction of the contribution of the forward ASE light to output light.

8. The SFS of claim 7, wherein the stability of the mean wavelength of the output light is further selected by reducing variations of the temperature of the fiber.

9. The SFS of claim 7, wherein the stability of the mean wavelength of the output light is further selected by estimating variations of the mean wavelength due to variations of the temperature of the fiber.

10. The SFS of claim 7, wherein the selected stability is within approximately ±0.5 part per million over a period of time of at least one hour.

11. The SFS of claim 7, wherein the selected stability is within approximately ±0.5 part per million over a period of time of at least 17 hours.

12. The SES of claim 7, wherein the fiber has a small-signal absorption of at least approximately 340 decibels.

13. The SFS of claim 7, wherein the pump source comprises a laser diode having a temperature and a laser diode current, whereby the temperature is controllable to be stable within approximately ±0.01 degree Celsius and the laser diode current is controllable to be approximately 10 microamps.

14. The SFS of claim 7, further comprising an optical isolator optically coupled to the second end of the fiber.

* * * * *

UNITED STATES PATENT AND TRADEMARK OFFICE
CERTIFICATE OF CORRECTION

| | | |
|---|---|---|
| PATENT NO. | : 7,764,718 B2 | |
| APPLICATION NO. | : 11/836040 | |
| DATED | : July 27, 2010 | |
| INVENTOR(S) | : Hee Gap Park et al. | |

It is certified that error appears in the above-identified patent and that said Letters Patent is hereby corrected as shown below:

In column 6 at line 52, please change ">λ>." to --<λ>.--.

In column 18 at line 11 (approx.), in claim 12, please change "SES" to --SFS--.

Signed and Sealed this
Eighteenth Day of January, 2011

David J. Kappos
*Director of the United States Patent and Trademark Office*